United States Patent
Fuchikami et al.

(10) Patent No.: US 9,863,767 B2
(45) Date of Patent: Jan. 9, 2018

(54) MOTION SENSOR DEVICE HAVING PLURALITY OF LIGHT SOURCES

(71) Applicant: PANASONIC INTELLECTUAL PROPERTY CORPORATION OF AMERICA, Torrance, CA (US)

(72) Inventors: Ryuji Fuchikami, Fukuoka (JP); Yuji Sugisawa, Fukuoka (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 277 days.

(21) Appl. No.: 14/423,608

(22) PCT Filed: Jun. 25, 2014

(86) PCT No.: PCT/JP2014/003403
§ 371 (c)(1),
(2) Date: Feb. 24, 2015

(87) PCT Pub. No.: WO2014/208087
PCT Pub. Date: Dec. 31, 2014

(65) Prior Publication Data
US 2015/0226553 A1    Aug. 13, 2015

(30) Foreign Application Priority Data

Jun. 27, 2013  (JP) ................. 2013-134600

(51) Int. Cl.
*G01C 11/06* (2006.01)
*G01C 11/02* (2006.01)
(Continued)

(52) U.S. Cl.
CPC ............ *G01C 11/06* (2013.01); *G01B 11/026* (2013.01); *G01C 11/02* (2013.01); *G01C 11/08* (2013.01);
(Continued)

(58) Field of Classification Search
CPC ..... G01C 11/06; G01C 11/02; G01C 2011/36; G01C 11/08; G01B 11/026; G06F 7/00;
(Continued)

(56) References Cited

U.S. PATENT DOCUMENTS

| 2001/0002850 | A1* | 6/2001 | Slatter | ............... H04N 1/02815 348/370 |
| 2005/0184217 | A1* | 8/2005 | Kong | ................. H05B 37/0227 250/205 |

(Continued)

FOREIGN PATENT DOCUMENTS

| JP | 06-042915 A | 2/1994 |
| JP | 2001-012909 A | 1/2001 |

(Continued)

OTHER PUBLICATIONS

International Search Report for corresponding International Application No. PCT/JP2014/003403 dated Sep. 30, 2014.
(Continued)

*Primary Examiner* — Jay Patel
*Assistant Examiner* — Salame Amr
(74) *Attorney, Agent, or Firm* — Renner, Otto, Boisselle & Sklar, LLP

(57) ABSTRACT

A motion sensor device including: an image sensor; first and second light sources; and a controller configured to control the image sensor and the first and second light sources. The controller makes the image sensor capture a first frame with light emitted from the first light source at a first time, makes the image sensor capture a second frame with light emitted from the second light source at a second time, performs masking processing on a first image gotten by capturing the first frame and on a second image gotten by capturing the second frame based on a difference between the first and second images, and obtain information about the distance to (Continued)

an object shot in the first and second images based on the first and second images that have been subjected to the masking processing.

11 Claims, 22 Drawing Sheets

(51) Int. Cl.
    *G01B 11/02*     (2006.01)
    *G01C 11/08*     (2006.01)
    *G06T 7/586*     (2017.01)
    *G06T 7/254*     (2017.01)
    *G01C 11/36*     (2006.01)

(52) U.S. Cl.
    CPC .............. *G06T 7/254* (2017.01); *G06T 7/586* (2017.01); *G01C 2011/36* (2013.01); *G06T 2207/10152* (2013.01)

(58) Field of Classification Search
    CPC ................ G06T 7/0073; G06T 7/2053; G06T 2207/10152
    USPC .......................................... 348/139
    See application file for complete search history.

(56) References Cited

U.S. PATENT DOCUMENTS

| | | | | |
|---|---|---|---|---|
| 2008/0122922 A1* | 5/2008 | Geng | ............... | G08B 13/19628 348/39 |
| 2008/0186475 A1 | 8/2008 | Kawata et al. | | |
| 2008/0278779 A1* | 11/2008 | Nishina | ................. | H04N 1/486 358/518 |
| 2009/0073307 A1* | 3/2009 | Kramer | ................ | H04N 5/2354 348/370 |
| 2011/0255303 A1* | 10/2011 | Nichol | ................... | G02B 6/006 362/606 |
| 2013/0003864 A1* | 1/2013 | Sullivan | ................. | H04N 19/44 375/240.25 |
| 2013/0033579 A1* | 2/2013 | Wajs | ...................... | G02B 7/365 348/46 |
| 2013/0182077 A1 | 7/2013 | Holz | | |
| 2013/0343610 A1* | 12/2013 | Dal Mutto | ......... | G06K 9/00355 382/103 |
| 2014/0198363 A1* | 7/2014 | Huang | ................ | G03H 1/2205 359/22 |

FOREIGN PATENT DOCUMENTS

| | | |
|---|---|---|
| JP | 2004-117235 A | 4/2004 |
| JP | 2008-122223 A | 5/2008 |
| JP | 2012-117896 A | 6/2012 |

OTHER PUBLICATIONS

Form PCT/ISA/237 for corresponding International Application No. PCT/JP2014/003403 dated Sep. 30, 2014 and partial English translation.

Wan et al., "CMOS Image Sensors with Multi-Bucket Pixels for Computational Photography", IEEE Journal of Solid-State Circuits, vol. 47, No. 4, Apr. 2012.

Ogino et al., "Simultaneous Recovery of Reflectance Property, Shape and Light Position Based on Torrance-Sparrow Model", The Institute of Electronics Information, and Communication Engineers, IEICE Technical Report IE2007-347, PRMU2007-331 (Mar. 2008).

Co-pending U.S. Appl. No. 14/423,625, filed Feb. 24, 2015.

Extended European Search Report dated Jun. 8, 2016 for corresponding European Application No. 14818362.7.

\* cited by examiner

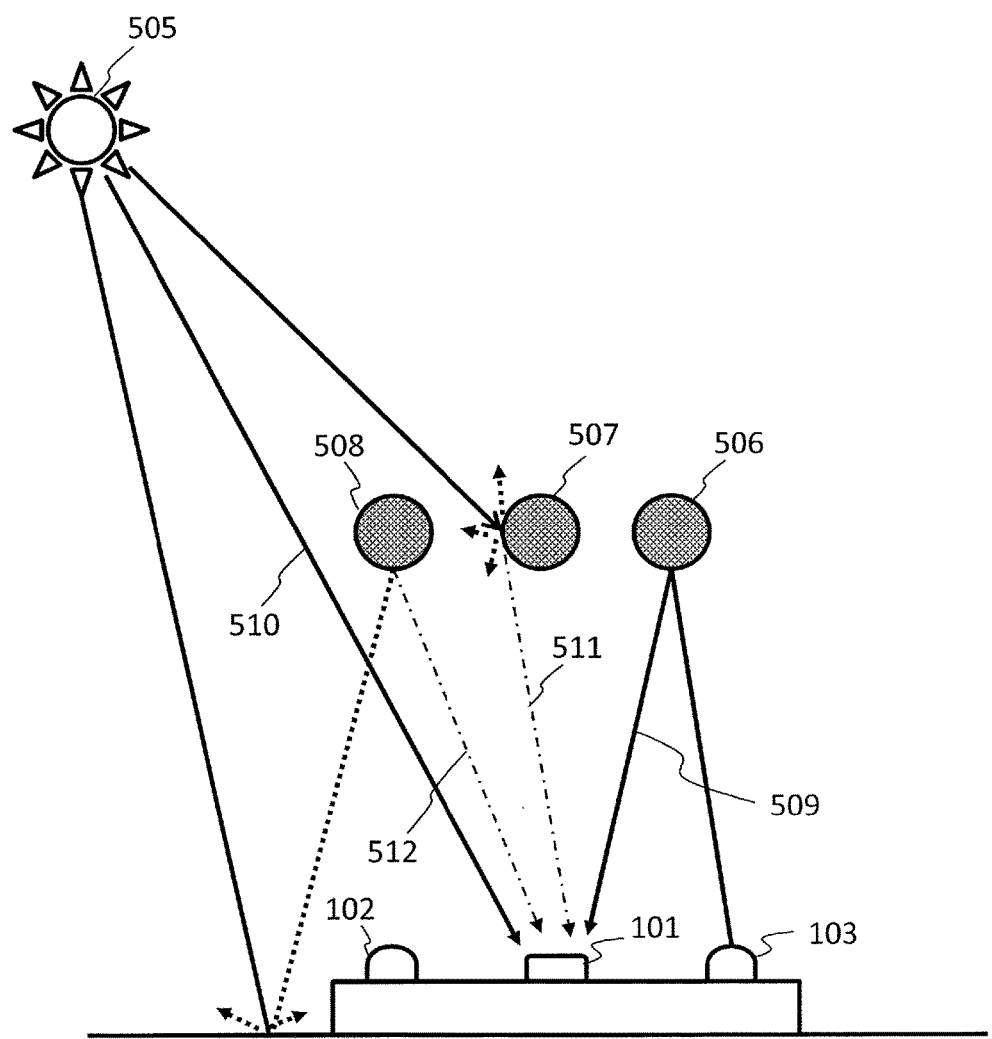

FIG.16
(a)
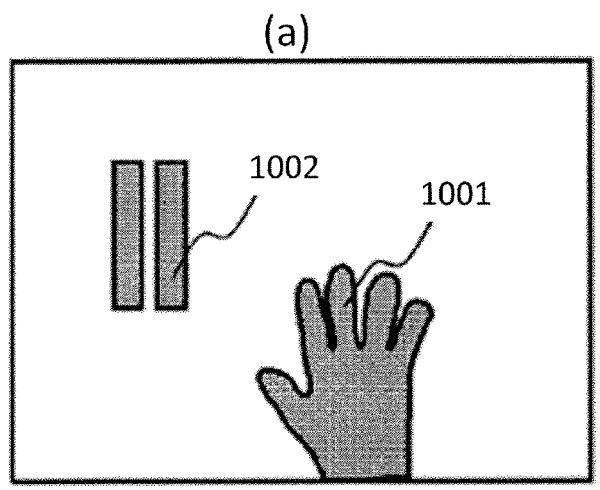
(b)
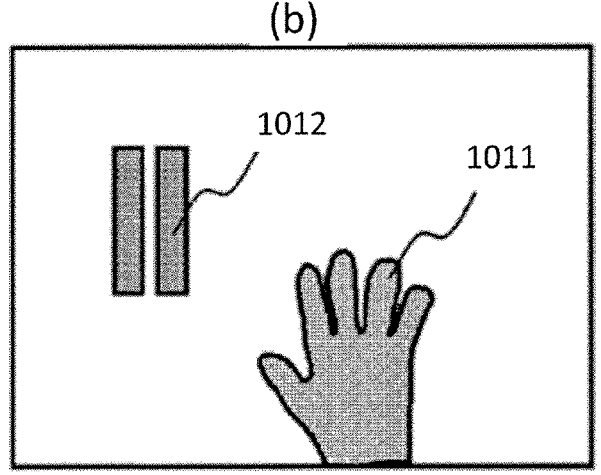
(c)
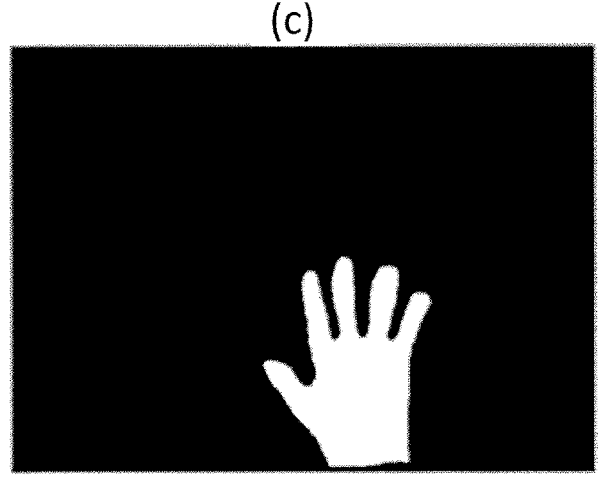

FIG.19
(a)
(b)

US 9,863,767 B2

MOTION SENSOR DEVICE HAVING PLURALITY OF LIGHT SOURCES

TECHNICAL FIELD

The present application relates to a motion sensor device with multiple light sources.

BACKGROUND ART

Patent Document No. 1 discloses a technique for measuring the distance to an object (or target) which is either standing still or moving based on a plurality of images that have been captured by a single image sensor by projecting light time-sequentially from multiple light sources onto the object.

Patent Document No. 2 discloses a distance measuring apparatus which can reduce the influence of background light. The distance measuring apparatus captures an image consisting of only background light components with no light emitted from any light sources and captures an image for measuring with light emitted from light sources. By subtracting the pixel values of the image consisting of only background light components from the pixel values of the image for measuring, the influence of background light can be reduced.

Non-Patent Document No. 1 discloses a sensor device which can shoot multiple images without performing read transfer and almost without creating a time difference.

Non-Patent Document No. 2 discloses a method for estimating the reflection property and shape of a target and the position of the light source simultaneously based on multiple images which have been shot with the position of the light source changed into various ones.

CITATION LIST

Patent Literature

Patent Document No. 1: Japanese Laid-Open Patent Publication No. 2001-12909
Patent Document No. 2: Japanese Laid-Open Patent Publication No. 2008-122223

Non-Patent Literature

Non-Patent Document No. 1: Gordon Wan, Xiangli Li, Gennadiy Agranov, Marc Levoy, and Mark Horowitz, "CMOS Image Sensors with Multi-bucket Pixels for Computational Photography", IEEE JOURNAL OF SOLID-STATE CIRCUITS, VOL. 47, NO. 4, Apr. 2012
Non-Patent Document No. 2: Shinsuke Ogino, Tsuyoshi Migita and Takeshi Shakunaga, "Simultaneous Recovery of Reflectance Property, Shape and Light Position Based on Torrance-Sparrow Model", The Institute of Electronics, Information, and Communication Engineers, IEICE Technical Report 1E2007-347, PRMU2007-331 (2008-03)

SUMMARY OF INVENTION

Technical Problem

According to the conventional technique for removing background light, extra image frames consisting of only background light components need to be captured with the light source turned OFF, thus causing an increase in the overall cost of the apparatus and a decline in its performance.

An embodiment of the present disclosure provides a novel motion sensor device which can overcome these problems.

Solution to Problem

To overcome the problem described above, a motion sensor device according to an aspect of the present disclosure includes: an image sensor; first and second light sources; and a controller configured to control the image sensor and the first and second light sources. The controller is configured to: make the image sensor capture a first frame with light emitted from the first light source at a first time; make the image sensor capture a second frame with light emitted from the second light source at a second time; perform masking processing on a first image gotten by capturing the first frame and on a second image gotten by capturing the second frame based on a difference between the first and second images; and obtain information about the distance to an object shot in the first and second images based on the first and second images that have been subjected to the masking processing.

A motion sensor device according to another aspect of the present disclosure includes: an image sensor; first and second light sources; and a controller configured to control the image sensor and the first and second light sources. The controller is configured to: make the image sensor capture a first frame with light emitted from the first light source at a first time; make the image sensor capture a second frame with light emitted from the second light source at a different output power from the first light source at a second time; perform masking processing on a first image gotten by capturing the first frame and on a second image gotten by capturing the second frame based on a difference between the first and second images; perform luminance correction processing on at least one of the first and second images that have been subjected to the masking processing based on a difference in optical output power between the first and second light sources; and obtain information about the distance to an object based on the ratio of the luminance of the object derived from the first image that has been subjected to the luminance correction processing to the luminance of the object derived from the second image that has been subjected to the luminance correction processing.

A motion sensor device according to still another aspect of the present disclosure includes: an image sensor; first and second light sources; and a controller configured to control the image sensor and the first and second light sources. The controller is configured to: make the image sensor capture a first frame with light emitted from the first light source at a first time; make the image sensor capture a second frame with light emitted from the second light source at a second time; generate differential data representing a difference between a first image gotten by capturing the first frame and a second image gotten by capturing the second frame; locate an estimated object area which forms part of the differential data between a point where the difference becomes a local maximum value and a point where the difference becomes a local minimum value and which has a direction corresponding to a direction in which the first and second light sources are arranged; perform masking processing on the entire first and second images but the estimated object area based on a difference between the first and second images; and obtain information about the distance to the object shot in the first and second images based on the first and second images that have been subjected to the masking processing.

A circuit according to yet another aspect of the present disclosure is to be used in a motion sensor device including an image sensor and first and second light sources. The circuit includes: a difference creating section which obtains and outputs differential data representing a difference between a first image gotten by making the image sensor capture a first frame with light emitted from the first light source at a first time and a second image gotten by making the image sensor capture a second frame with light emitted from the second light source at a second time; a local maximum value searching section which determines whether or not the difference is equal to or greater than a first threshold value in data on a single horizontal line of the differential data; a local minimum value searching section which determines whether or not the difference is equal to or smaller than a second threshold value that is smaller than the first threshold value in the data on the single horizontal line of the differential data; a mask creating section which determines whether or not the absolute value of the differential data is equal to or smaller than a third threshold value; a controller which changes states from a first operating state to a second operating state when informed by the local maximum value searching section that the difference is equal to or greater than the first threshold value and which changes states from the second operating state to the first operating state when informed by the local minimum value searching section that the difference is equal to or smaller than the second threshold value; a mask information storage section which stores mask information of a background area based on a decision result obtained by the mask creating section; a pairing information storage section which stores information about a pairing range that is located between a point where the difference becomes equal to or greater than the first threshold value and a point where the difference becomes equal to or smaller than the second threshold value when the controller is in the second operating state; and a mask subtracting section which applies the AND of the pairing information stored in the pairing information storage section to the mask information stored in the mask information storage section when the controller changes states from the second operating state to the first operating state.

A storage medium according to yet another aspect of the present disclosure stores information about the circuit that is implementable as reconfigurable logic.

An image processing apparatus according to yet another aspect of the present disclosure is to be used in a system which includes an image sensor, first and second light sources, and the image processing apparatus to process a plurality of images supplied from the image sensor. The apparatus includes: a processor; a memory; and a computer program stored in the memory. The computer program is defined to make the processor get a first image captured by the image sensor with light emitted from the first light source at a first time; get a second image captured by the image sensor with light emitted from the second light source at a second time; perform masking processing on the first and second images based on a difference between the first and second images; and obtain information about the distance to the object shot in the first and second images based on the first and second images that have been subjected to the masking processing.

These generic and specific implementations may be embodied as a system, method, integrated circuit, computer program or storage medium or any arbitrary combination thereof.

Advantageous Effects of Invention

An embodiment of a motion sensor device according to the present disclosure can measure the distance with the influence of background light lessened and without capturing any extra image frames.

BRIEF DESCRIPTION OF DRAWINGS

FIG. 8 Illustrates a situation where a motion sensor device is put at a place where there is external light and a human being's hand is held over the measuring range.

FIG. 16 Illustrates how to perform masking processing according to the second embodiment. (a) illustrates an exemplary first image to be obtained by capturing a first image frame. (b) illustrates an exemplary second image to be obtained by capturing a second image frame. And (c) illustrates an example of a first image that has been subjected to the masking processing.

FIG. 19 (a) illustrates a masked image which was generated when a hand image at a short distance was processed by using the device of the second embodiment, and (b) illustrates a masked image corrected through the processing of a third embodiment.

DESCRIPTION OF EMBODIMENTS

First of all, the basic principle on which the distance to an object (or subject) can be measured by a motion sensor device according to the present disclosure will be described.

Figure 1A:
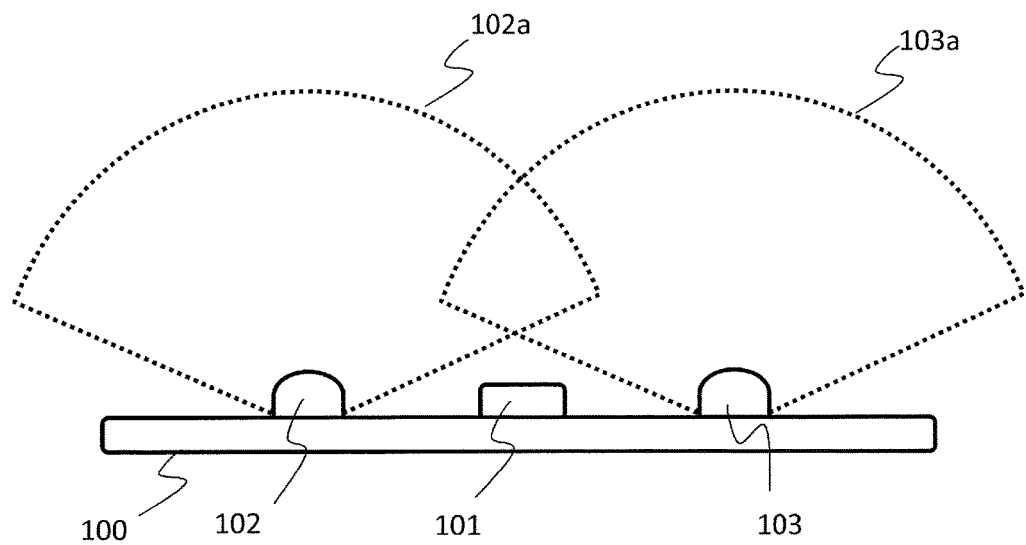
FIG. 1A A cross-sectional view schematically illustrating a cross section of a motion sensor device with two light sources.
Figure 1B:
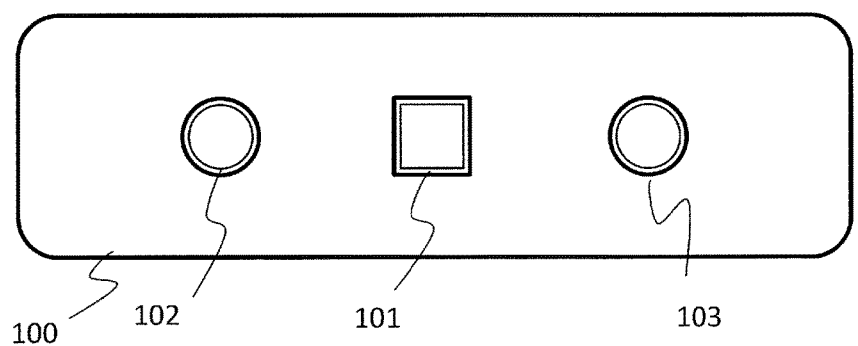
FIG. 1B A top view of the device shown in FIG. 1A.

FIG. 1A is a cross-sectional view schematically illustrating a cross section of a motion sensor device, and FIG. 1B is a top view of the device shown in FIG. 1A.

The device shown in FIGS. 1A and 1B includes an image sensor 101 which is arranged at its center and two light source units 102 and 103 which are arranged on the right- and left-hand sides of the image sensor 101. In the example illustrated in FIGS. 1A and 1B, the image sensor 101 and light source units 102, 103 are mounted on a single substrate 100. The image sensor is a solid-state image sensor in which a huge number of very small photosensitive cells (photodiodes) are arranged in columns and rows, and is typically a CCD (charge-coupled device) type or a CMOS type. In the following description, the light source units will be sometimes simply referred to as "light sources".

In FIG. 1A, illustrated schematically are light 102a emitted from the first light source 102 and light 103a emitted from the second light source 103. This device can measure the distance to an object of measurement (i.e., object) by capturing an image with the light sources 102, 103 turned ON alternately. It should be noted that "to measure the distance" will also refer herein to calculating an estimated distance from the image sensor to the object or obtaining an estimated value indicating the object's position in a space. Examples of the objects include a human being's hand(s) or finger(s) and a pen or something else held in his or her hand. The object may be in motion. A three-dimensional motion sensor device which can obtain in real time either the distance to a person's fingertip that is moving at high speeds or an estimated value indicating the fingertip's position may be used as an "input device" in various kinds of electronic devices including computers, tablet terminals, smartphones, game consoles and consumer electronic devices.

Figure 2:
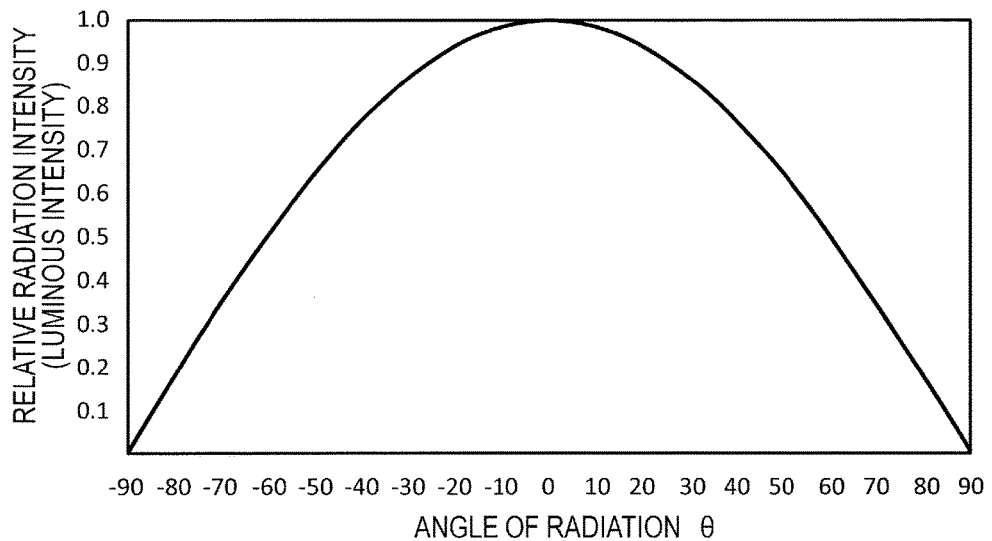
FIG. 2 A graph showing how the relative radiation intensity of a light source changes with the angle of radiation.
Figure 3:
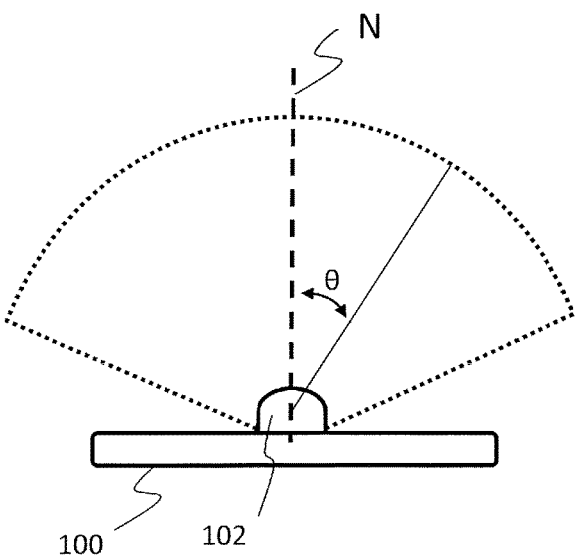
FIG. 3 Illustrates the angle of radiation of a light source.

FIG. 2 is a graph showing the radiation pattern (i.e., the light distribution characteristic) of the light emitted from each of the light sources 102 and 103. The abscissa of this graph represents the angle θ defined by the radiation direction with respect to a normal N to the substrate 100 as shown in FIG. 3. On the other hand, the ordinate of this graph represents the relative radiation intensity. In the following description, the angle θ defined by the radiation will be sometimes hereinafter referred to as the "angle of radiation". It should be noted that the relative radiation intensity value corresponds to the illuminance of an object which is arranged at a position in a direction that defines a particular angle with respect to the light source (i.e., radiation illuminance).

As can be seen from FIG. 2, the radiation emitted from each of the light sources 102 and 103 exhibits the highest intensity when the angle θ is zero degrees. In the example shown in FIG. 2, the light sources 102 and 103 have a light distribution characteristic, of which the radiation intensity can be approximated by $I_0 \times \cos\theta$. However, this is only an example and the light sources 102 and 103 do not have to have the light distribution characteristic shown in FIG. 2. In addition, the radiation emitted from the light sources 102 and 103 does not have to be visible light but may also be an electromagnetic wave such as an infrared ray which falls within a wavelength range to which the human vision is insensitive. In this description, the radiation emitted from a light source will be sometimes simply referred to as "light" for the sake of simplicity. This term "light" does not have to be visible light but may also refer to any of various kinds of electromagnetic waves which can be detected by the image sensor.

Next, it will be described how the device described above measures the distance to the object.

Figure 4A:
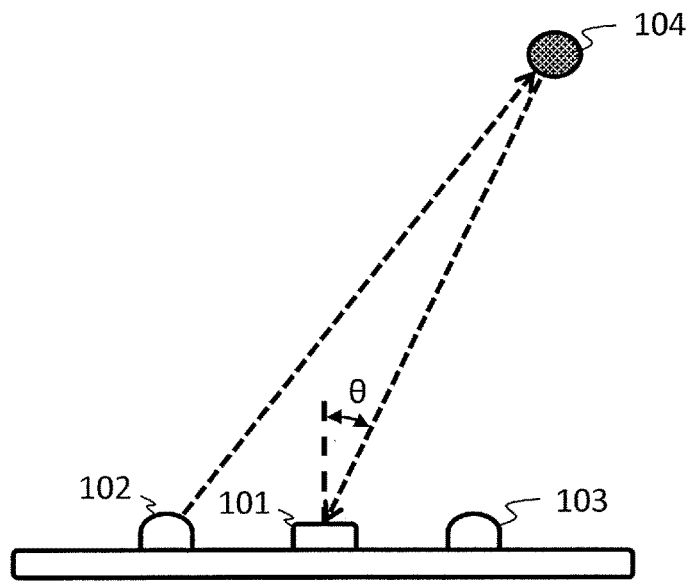
FIG. 4A Illustrates how an object 104 is irradiated with light that has been emitted from a first light source 102.
Figure 4B:
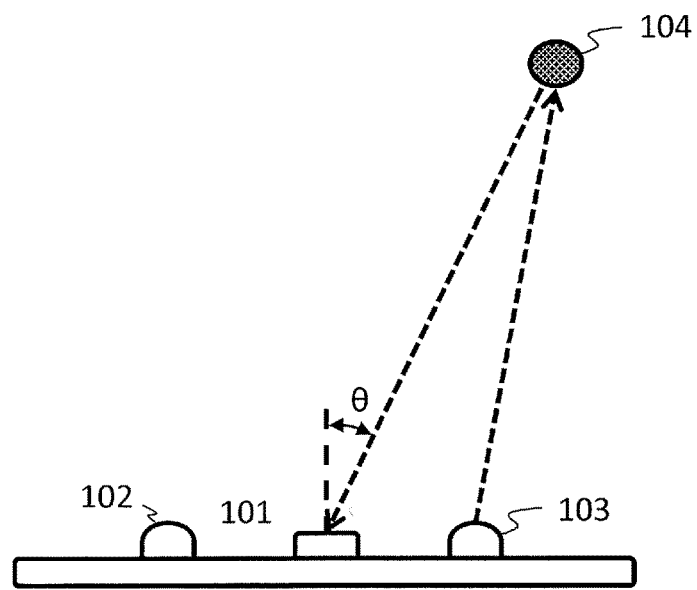
FIG. 4B Illustrates how an object 104 is irradiated with light that has been emitted from a second light source 103.

First of all, look at FIGS. 4A and 4B. FIG. 4A illustrates how the object 104 is irradiated with light that has been emitted from the first light source 102 and how part of the light reflected from the object 104 is incident on the image sensor 101. On the other hand, FIG. 4B illustrates how the object 104 is irradiated with light that has been emitted from the second light source 103 and how part of the light reflected from the object 104 is incident on the image sensor 101. The object 104 is supposed to be located at substantially the same position in both of FIGS. 4A and 4B.

At a first time, this device makes the image sensor 101 perform a first shooting session with the light source 102 turned ON and the light source 103 turned OFF as shown in FIG. 4A. Next, at a second time, the device makes the image sensor 101 perform a second shooting session with the light source 103 turned ON and the light source 102 turned OFF as shown in FIG. 4B. The durations (i.e., exposure times) of the first and second shooting sessions are supposed to be short enough to be able to handle the object 104 as substantially a still object.

When the first shooting session is carried out, part of the light emitted from the light source 102 is reflected from the object 104 and incident on the image sensor 101. As a result, a luminance image corresponding to the intensity of the light incident on the image sensor 101 is obtained. In the same way, when the second shooting session is carried out, part of the light emitted from the light source 103 is reflected from the object 104 and incident on the image sensor 101. As a result, a luminance image corresponding to the intensity of the light incident on the image sensor 101 is obtained.

The object's (104) luminance (which is either its luminance distribution or luminance image) can be obtained based on the two image frames captured as a result of the first and second shooting sessions. In this description, the "luminance" does not refer herein to a psychophysical quantity with the unit [candela/m$^2$] but refers herein to a "relative luminance" to be determined for each pixel of the image sensor and corresponds to the quantity of light or quantity of radiation. Each of the pixels that form each image frame has a "luminance value" corresponding to the quantity of light that the pixel has received.

Since the object 104 has its own size, each image representing the object 104 is usually comprised of multiple pixels. The "luminance" of the object 104 can be determined by various methods based on the luminance values of those pixels that form the object (104) image. For example, the luminance of the brightest "pixel" or "pixel block" of the object (104) image may be regarded as the luminance of the object 104. Or the average luminance of all pixels that form the object (104) image may be regarded as the luminance of the object 104.

Figure 5:
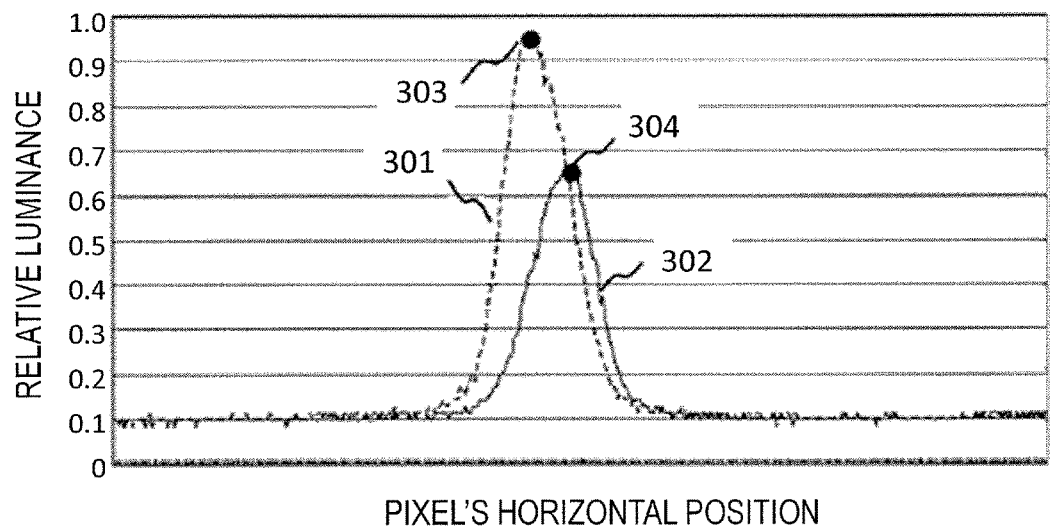
FIG. 5 A graph showing how the luminance of image capturing data changes with a pixel location on a single line.

FIG. 5 is a graph showing the luminance value of a single horizontal line that runs across the object (104) image in each of the two image frames that have been obtained by the method described above. The abscissa indicates the location of a pixel on a particular horizontal line in the image, and the ordinate indicates the relative luminance. In this graph, the curve 301 represents the luminance when the light source 102 is ON, and the curve 302 represents the luminance when the light source 103 is ON. In this description, the "horizontal line" refers herein to a line which runs laterally across an image. In this embodiment, the direction in which the light sources 102 and 103 are arranged corresponds to the lateral direction on the image captured by the image sensor 101. That is why the distribution of relative luminances on a horizontal line on which the object is located in the image will be considered. If the direction in which the light sources 102 and 103 are arranged corresponds to a different direction from the lateral direction on the image, then the distribution of relative luminances in that corresponding direction may be considered.

In the example shown in FIG. 5, each of the curves 301 and 302 has a single peak. Specifically, the curve 301 has an extreme value 303 at a certain pixel location, and the curve 302 has an extreme value 304 at another pixel location.

As described above, the object 104 is substantially standing still between the two frames. Thus, the difference is made between the curves 301 and 302 because the radiation produced by the light source 102 has a different pattern from the radiation produced by the light source 103. The ratio of the luminance of the image captured by making the light emitted from the light source 102 and then reflected from the object 104 be incident on the image sensor 101 to that of the image captured by making the light emitted from the light source 103 and then reflected from the object 104 be incident on the image sensor 101 depends on the relation between the distance from the light source 102 to the object 104 and the distance from the light source 103 to the object 104.

Figure 6:
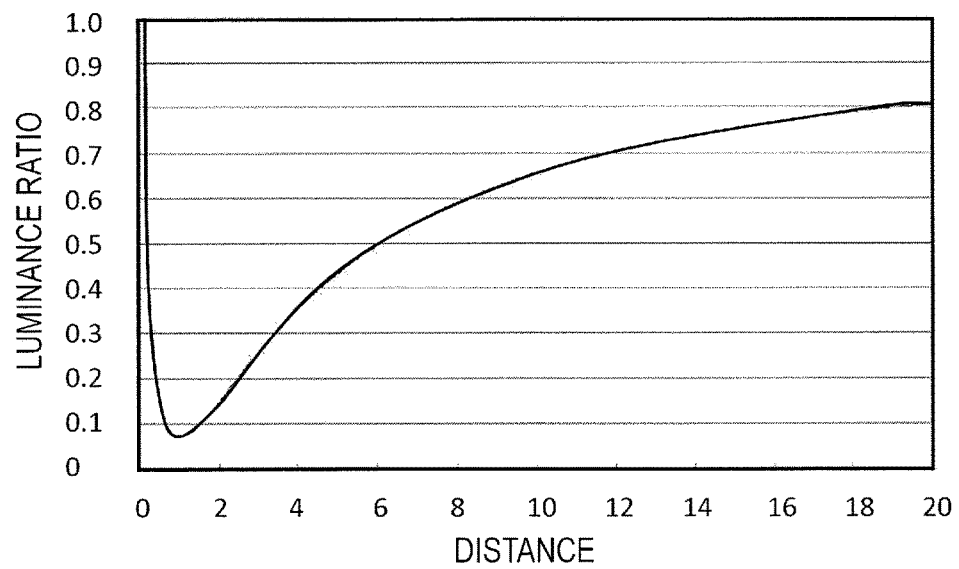
FIG. 6 A graph showing how the luminance ratio changes with the distance at a certain angle of radiation.

The distance to the target can be measured based on the ratio of the luminances of the images captured. FIG. 6 is a graph showing an exemplary relation between the distance and the luminance ratio in a direction which defines an angle of 45 degrees with respect a normal to the imaging surface of the image sensor 101. In the graph shown in FIG. 6, the abscissa indicates the relative distance to the object and the ordinate indicates the luminance ratio in a situation where light sources with the characteristic shown in FIG. 2 are arranged on the right- and left-hand sides at a predetermined distance from the image sensor 101. The "distance" on the axis of abscissas is measured based on the distance between the image sensor 101 and the light source, and a distance of "1" is equal to the distance between the image sensor 101 and the light source.

The object's luminance (or illuminance) attenuates inversely proportionally to the square of the distance from the light source to the object. Thus, the luminance ratio varies according to the distance. Since the radiation characteristic shown in FIG. 2 is already known, the distance can be detected or estimated accurately based on this radiation characteristic.

FIG. 6 shows an exemplary relation between the distance and the luminance ratio when the radiation angle θ is degrees. The relations between the distance and the luminance ratio can be obtained in advance in the same way with respect to multiple different angles, too. The object's angle can be obtained based on the position of the object to be captured by the image sensor.

As can be seen from FIG. 6, if the distance between the object and the image sensor is longer than approximately one, the distance can be measured based on the ratio of the extreme values 303 and 304.

The luminance ratio of the object can be obtained by various methods. According to the simplest one, the ratio of a local maximum luminance value 303 to another local maximum luminance value 304 shown in FIG. 5 is regarded as the luminance value as it is. Even if the respective coordinates of these two local maximum values 303 and 304 do not agree with each other but if the material property of the object is supposed to be substantially uniform within the object area and if such a tiny local difference in distance is neglected, the ratio of these extreme values 303 and 304 can be used as the luminance ratio for calculating the distance.

Alternatively, from the standpoint of reducing noise such as light shot noise involved with shooting, the ratio of the integrals of the luminance values within the object area on the image may also be used as the luminance ratio.

Still alternatively, if a local difference in the material of the subject is also taken into account, a technique such as the photometric stereo method disclosed in Non-Patent Document No. 2 may also be employed. Although the photometric stereo method requires doing a lot of computations, an increase in computational complexity can be lessened by either supposing that the quantity of light does not change within a local area or that the target is a continuum. The computational complexity can also be cut down by approximating the shape of the target for the motion sensor device to be a shape represented by a particular equation, for example.

In the example described above, light sources, of which the relative radiation intensity changes with the radiation angle, are used. However, this measuring method can also be adopted even when light sources that do not have such a characteristic are used. Unless light sources which emit parallel light rays are used, the intensity of the light should have some light distribution characteristic in a three-dimensional space. That is why such light sources can also be used to measure the distance. For example, even in "point light sources" of which the light distributions are isotropic, the illuminance and luminance on the object also attenuate inversely proportionally to the square of the distance from the light sources. Thus, even such light sources can also be said to be light sources having different radiation patterns in a three-dimensional space.

Figure 7A:
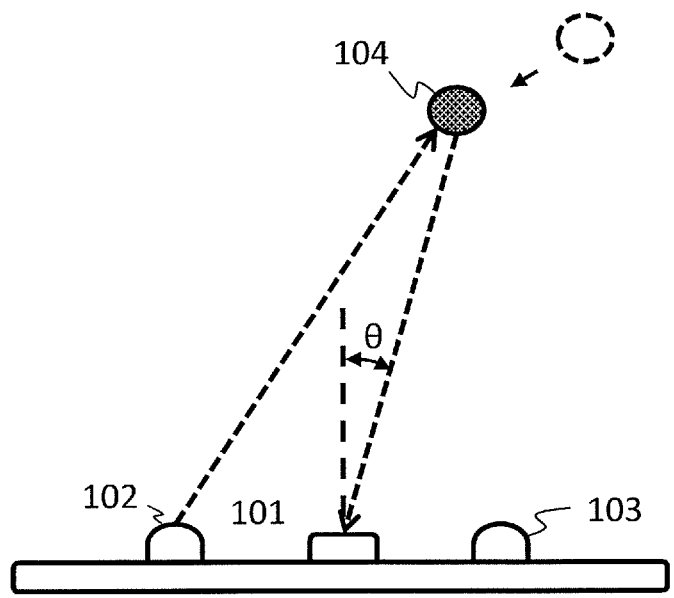
FIG. 7A Illustrates how an object 104 that has moved slightly is irradiated with the light emitted from the first light source 102.
Figure 7B:
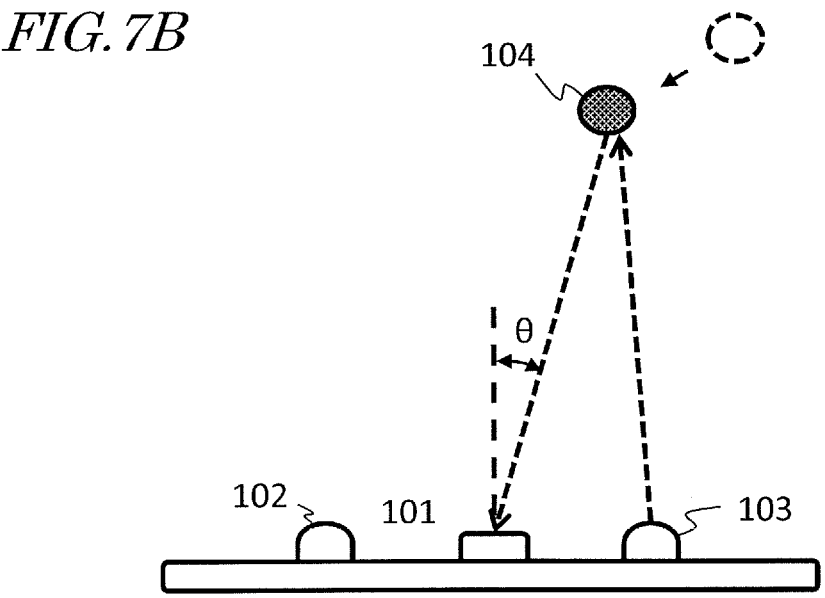
FIG. 7B Illustrates how the object 104 that has moved slightly is irradiated with the light emitted from the second light source 103.

Next, look at FIGS. 7A and 7B, which illustrate how a shooting session is performed on the object 104 that has moved from the position shown in FIGS. 4A and 4B. As long as an image can be captured and the distance can be estimated quickly, even the distance to a moving object 104 can also be measured by the method described above. By illuminating the object with the light sources 102 and 103 alternately and capturing the object image using the image sensor 101 repeatedly a number of times, the position of the moving object 104 can be detected. As a result, the change in the position of the object 104, or its motion, can be detected.

Such a single lens motion sensor device which uses the ratio of the object's luminances in two images would have its accuracy of measurement decreased under the influence of background light emitted from a light source outside of the apparatus, which is a problem.

FIG. 8 illustrates a situation where a single lens motion sensor device is put at a place where there is external light and a human being's hand is held over the measuring range. In FIG. 8, his or her index finger 506, middle finger 507 and ring finger 508 are shown as the objects of measurement. Light rays incident on the image sensor 101 include a reflected light ray 509 coming from the light source 102 or 103, an external direct light ray 510 coming from an external light source 505, an external first-order reflected light ray 511 also coming from the external light source 505, and an external second-order reflected light ray 512 also coming from the external light source 505.

The external direct light ray 510 and external first-order and second-order reflected light rays 511 and 512 have all come from the light source 505 other than the light sources 102 and 103, and will be hereinafter referred to as "background light rays". For the output signal of the image sensor 101, such background light components become measuring noise.

A technique for removing such background light components is disclosed in Patent Document No. 2, for example. According to the technique disclosed in Patent Document No. 2, an image consisting of only background light components is captured with no light emitted from a light source, separately from an image for measuring to be captured with light emitted from a light source. By subtracting the luminance value of such an image consisting of only background light components from the luminance value of the image for measuring, the background light component can be removed.

Figure 9:
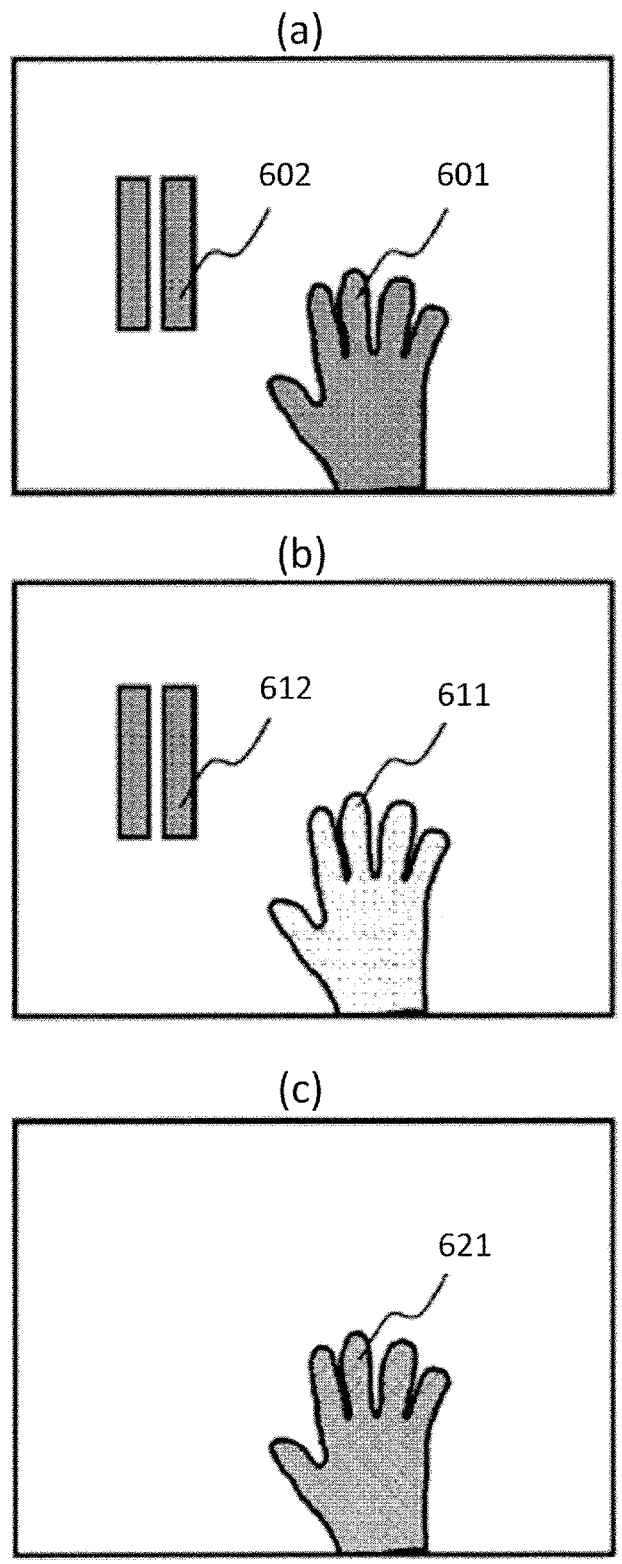
FIG. 9 Shows the effects to be achieved by a conventional technique for removing background light components. (a) illustrates an exemplary image to be captured when the shooting session is performed with light emitted from the light source 103 in the example illustrated in FIG. 8. (b) illustrates an exemplary image to be captured when the shooting session is performed with no light emitted from any light source in the example illustrated in FIG. 8. And (c) illustrates a differential image obtained by subtracting the image shown in FIG. 9(b) from the image shown in FIG. 9(a).

FIG. 9 shows the effects to be achieved by removing those background light components. Specifically, FIG. 9(a) illustrates an exemplary image to be captured when the shooting session is performed with light emitted from the light source 103 in the example illustrated in FIG. 8. This image includes an image 601 of the hand as the subject and an image 602 of a fluorescent lamp that is an external light source on the ceiling.

On the other hand, FIG. 9(b) illustrates an exemplary image to be captured when the shooting session is performed with no light emitted from any light source in the example illustrated in FIG. 8. This image also includes an image 611 of the hand as the subject and an image 612 of a fluorescent lamp that is an external light source on the ceiling. Since no light is emitted from any light source, the luminance of the image 611 of the hand located near the image sensor is lower in this image than in the image shown in FIG. 9(a).

And FIG. 9(c) illustrates a differential image obtained by subtracting the image shown in FIG. 9(b) from the image shown in FIG. 9(a). In this description, to "subtract another image from one image" means generating a new image by subtracting the luminance values of corresponding pixels of another image from the luminance values of respective pixels of one image. In the differential image shown in FIG. 9(c), the image 602 of the external light source has been removed.

The images 602 and 612 of the external light source are images of light corresponding to the external direct light ray 510 shown in FIG. 8. These images are shot at substantially the same luminance as long as the shooting condition such as the exposure time remains the same. For that reason, in the differential image shown in FIG. 9(c), the image 602 of the external light source has disappeared as a result of the differential operation.

Most of the subject image 601 shown in FIG. 9(a) is the components of the reflected light ray 509 coming from the light source 103. But the subject image 601 also includes some components of the external first-order and second-order reflected light rays 511 and 512 coming from the external light source 505. On the other hand, the subject image 611 shown in FIG. 9(b) consists of ONLY the components of the external first-order and second-order reflected light rays 511 and 512. Thus, the subject image 621 of the differential image shown in FIG. 9(c) consists of ONLY the components of the reflected light ray 509 coming from the light source 103. That is to say, this differential image is equivalent to an image to be shot in an environment in which there is no external light source 505.

In this manner, an image which is hardly affected by the background light can be obtained. To obtain such an image in this way, however, extra image frames need to be captured with no light emitted from any light source unit at all. A motion sensor device needs to obtain a background light image almost without causing any time lag with respect to an image for measuring. For that reason, an expensive image sensor which can perform the exposure process on one more extra frame should be used, which would cause an increase in cost. In addition, it takes an additional time to retrieve and transfer the frame data that has been obtained without emitting light from any light source unit, thus causing a decrease in measuring frame rate. As a result, the overall performance of the motion sensor device declines.

The present inventors spotted out such a problem with the prior art and perfected a technique of the present disclosure. According to an embodiment of the present disclosure, there is no need to capture any extra image frames with the light source turned OFF in order to obtain a background light image. Consequently, the background light components can be removed from the image without causing an increase in the cost of the apparatus or a decline in its performance.

When a motion sensor device is used in an ordinary way, no obstacle or additional light source will be put between the image sensor and the object of sensing. That is why the light that can be the background light is usually external light coming from either a light on the wall or on the ceiling or the outdoor sun. The only situation where the background light can be a big problem should be a situation where there is the external light source 505 beyond the objects 506 to 508 as viewed from the image sensor 101 as shown in FIG. 8.

The intensity of the external first-order and second-order reflected light rays 511 and 512 shown in FIG. 8 is much lower than the intensity of the light ray 509 coming from the light source 102, 103. The reason is that although emitted for just a short time from the light source 102, 103, the light ray 509 has so high an intensity that even the light 509 that has been diffuse-reflected from the object has as high an intensity as the external direct light ray 510. On the other hand, the intensities of the external first-order and second-order reflected light rays 511 and 512 that have gone through first- and second-order diffuse reflection are much lower than that of the reflected light ray 509 coming from the light source 102, 103 or that of the external direct light ray 510.

It should be noted that the external first-order reflected light ray 511 has not been reflected so many times as, but has as low an intensity as, the external second-order reflected light ray 512. The reason is that both of these light rays have been incident on the object at a shallow angle and then reflected from the object due to the relative arrangement of the external light source and the object. Considering the diffuse reflection pattern which is generally known by the Lambert's cosine law, the intensity of light reflected at such a shallow angle becomes very weak.

In view of these considerations, a motion sensor device according to an embodiment of the present disclosure does not remove background light components completely unlike Patent Document No. 2 but does remove only the components of light that has come directly from the external light source. As a result, the background light components can be removed without causing an increase in cost or a decline in performance.

Specific embodiments of the present disclosure based on these considerations will now be described.

(Embodiment 1)

First of all, a motion sensor device as a first embodiment will be described.

Figure 10:
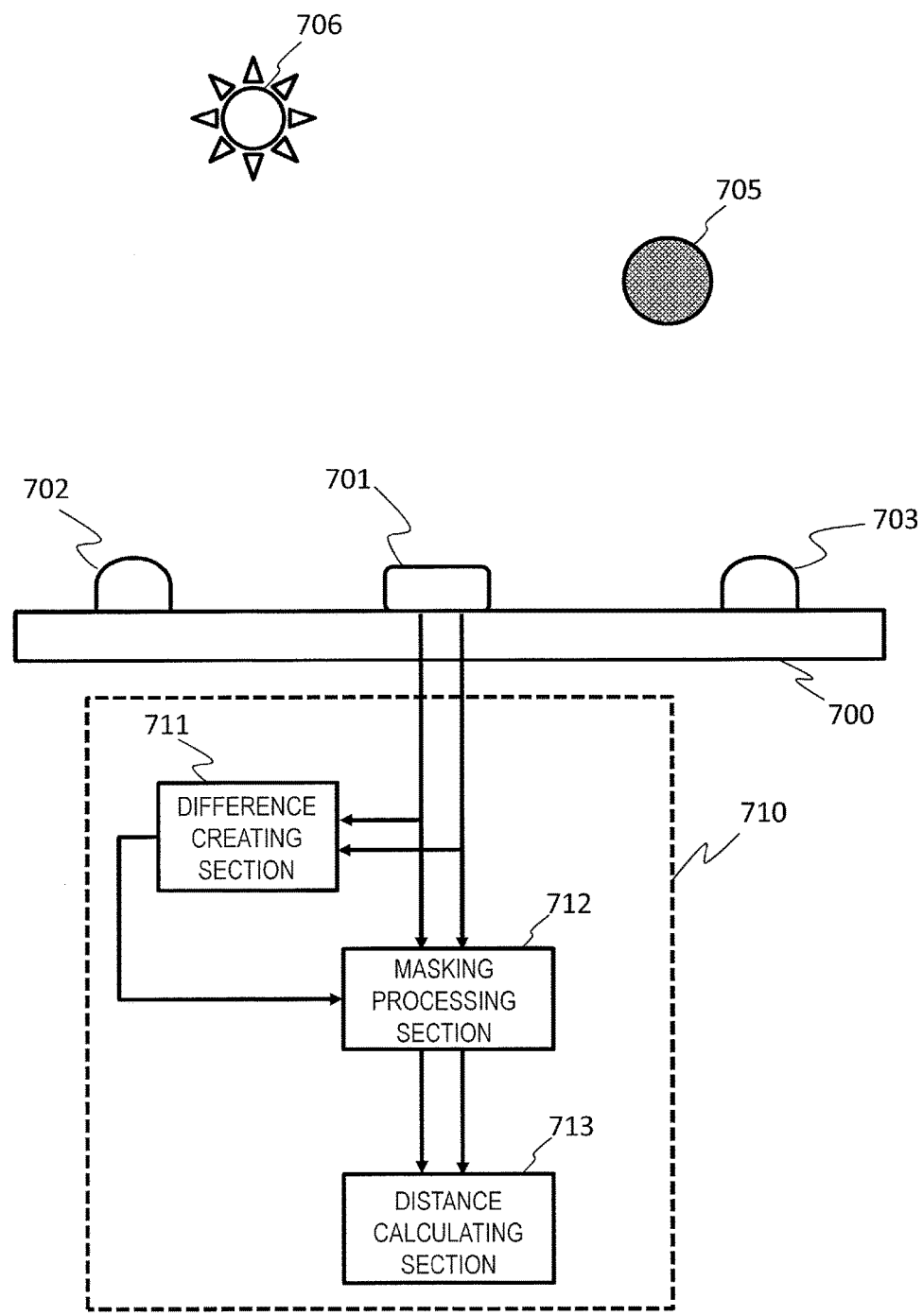
FIG. 10 Schematically illustrates a configuration for a motion sensor device according to a first embodiment of the present disclosure.

FIG. 10 schematically illustrates a configuration for a motion sensor device including an image sensor 701, two light sources (which will be hereinafter referred to as a first light source 702 and a second light source 703), and a controller 710 which controls these members. The image sensor 701 and light sources 702, 703 are mounted on a substrate 700. In FIG. 10, also illustrated are an external light source 706 and an object 705. Although the external light source 706 is the sun in the example shown in FIG. 10, the external light source 706 may also be any other kind of light source such as a fluorescent lamp as in the example described above.

The controller 710 not only controls the shooting sessions of two image frames by two continuous exposure processes as described above but also performs the processing of removing background light components from the two images captured and the processing of calculating the distance based on the two images from which the background light components have been removed. As functional blocks for performing these kinds of processing, the controller 710 includes a difference creating section 711, a masking processing section 712, and a distance calculating section 713. Part or all of the controller 702 may be implemented on the substrate 700 or on a different substrate. Optionally, part of the function of the controller 710 may be performed by an electronic device which is arranged at a distant location.

Figure 11:
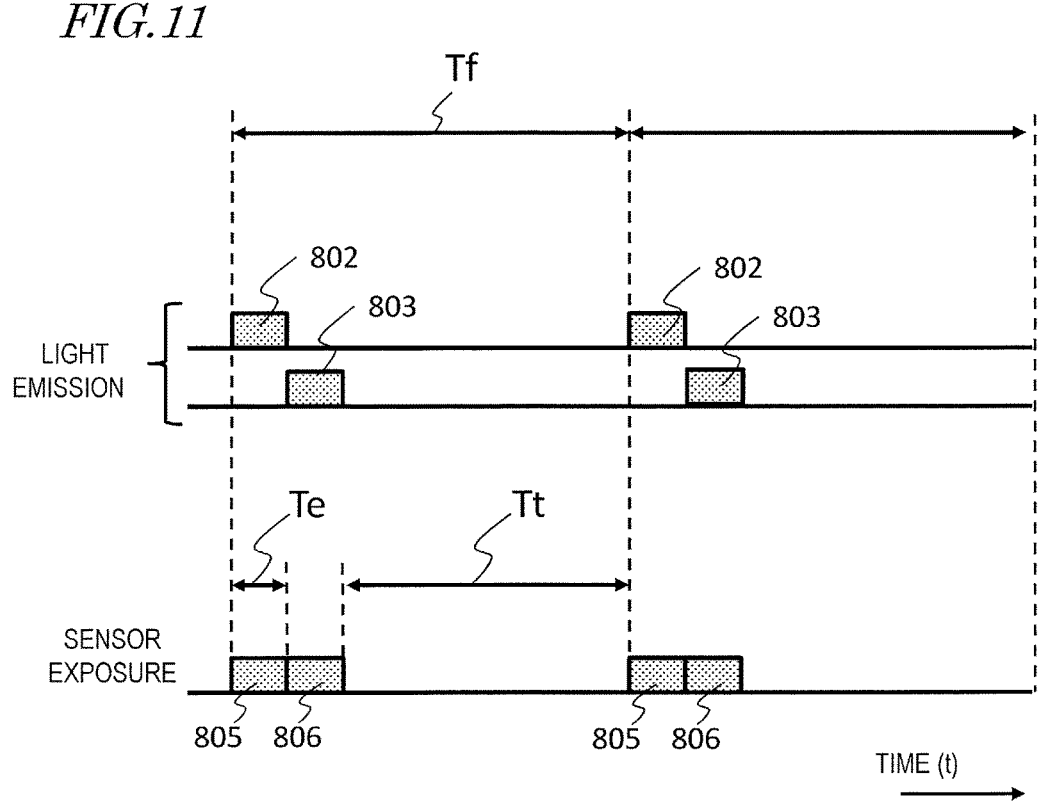
FIG. 11 A timing chart showing timings for the motion sensor device of the first embodiment to control the light sources and the image sensor.

FIG. 11 is a timing chart showing the timings for this motion sensor device to control the light sources and the image sensor. The periods 802 and 803 shown in FIG. 11 correspond to the periods in which the light sources 702 and 703 are respectively turned ON. The first and second exposure periods 805 and 806 correspond to the respective periods in which first and second frames are captured by the image sensor 701. Although the light sources 702 and 703 are supposed to be turned ON in this order in the timing chart shown in FIG. 11, the light sources may also be turned ON in any arbitrary order.

An ordinary image sensor captures a single frame per exposure process, has image data thus obtained retrieved by an external device, and then captures the next frame. That is to say, an image data reading operation is performed on a frame-by-frame basis. With such an image sensor, in the interval after an exposure process for the $n^{th}$ frame (where n is an integer) has been finished and before an exposure process for the $(n+1)^{th}$ frame is started, it will take some time to perform the operation of transferring every electric charge obtained by capturing the $n^{th}$ frame and outputting it to an external device.

On the other hand, according to this embodiment, as soon as the first exposure period 805 ends, the second exposure period 806 begins as shown in FIG. 11. The electric charges of respective pixels which have been created by capturing the first frame in the first exposure period 805 are transferred to, and stored in, a storage section before the second exposure period 806 begins. After that, a signal representing the electric charges stored in the storage section and the electric charges created in the second exposure period 806 is read and output to an external device in the period Tt.

According to this embodiment, if the length of the first and second exposure periods is Te, the data of two image frames is retrieved at a rate to be determined by (1/Tf) which is the inverse number of Tf that is as long as 2×Te+Tt.

The period of time Tt varies depending on the number of pixels but may be set to be approximately 20 milliseconds with the data transfer rate taken into account. On the other hand, the period of time Te may be set to be as short as 1 millisecond or less, e.g., 25 microseconds. If two frames are continuously captured within a short period of time, even the distance to an object that is moving at high speeds (such as a person's fingertip) can also be measured. For example, if 2×Te is 50 microseconds, even an object that is moving at a speed of 1 meter per second will move only 0.050 millimeters while the first and second frames are captured. On the other hand, if those frames are captured at a normal frame rate (of 60 frames per second, for example), then the object will move as much as 50 millimeters in that period. Even if the object is shot at as high speeds as 1000 frames per second, the object will still move 3 millimeters in that period. Since the period of time after the first frame has started and until the second frame ends can be shortened to 2 milliseconds or less according to this embodiment, such a device can be used in practice as a motion sensor device in various kinds of applications.

According to the configuration of this embodiment, the distance to the object can be calculated based on the two images that have been gotten by capturing the first and second frames. The luminance of a frame which has been captured within a sufficiently short time under intense light emitted is substantially proportional to the intensity of the reflected light. The luminances of the object that has been shot in the first and second frames will be hereinafter referred to as first and second luminances, respectively. The respective luminances are determined by the angles and distances that are defined by the relative positions of the object to the respective light sources. As described above, the distance to the object can be estimated based on the ratio of these luminances.

According to this embodiment, by using a rather expensive image sensor which can capture two frames continuously, either the distance to an object that is moving at high speeds or the three-dimensional motion of such an object can be detected. If the motion velocity of the target that is the object of measurement is expected to be sufficiently low, an ordinary one-frame-exposure image sensor may be used.

Figure 12:
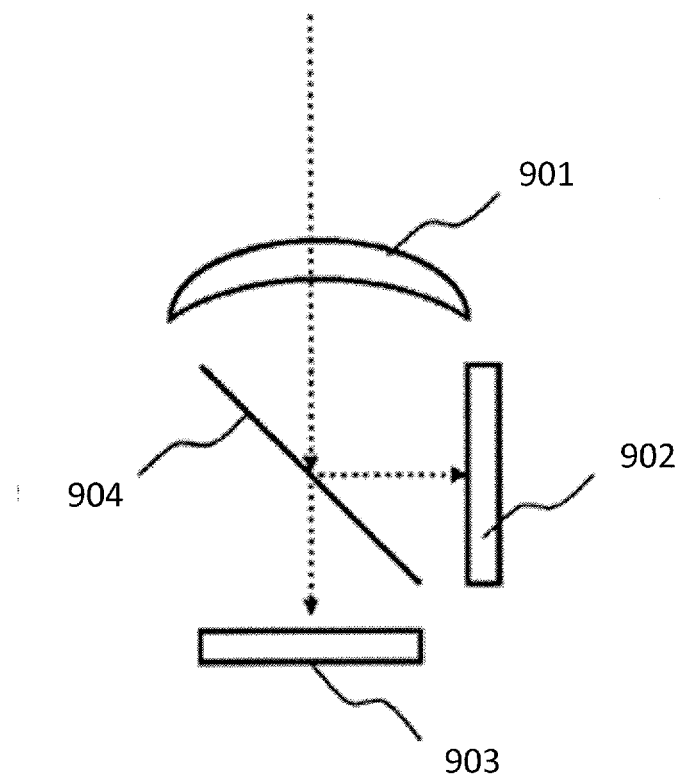
FIG. 12 Illustrates an example of a motion sensor device including a lens 901, two image sensors 902, 903 and a half mirror 904.

Alternatively, a configuration such as the one shown in FIG. 12 may also be adopted. The motion sensor device shown in FIG. 12 includes a lens 901, two image sensors 902, 903 and a half mirror 904. The image sensors 902 and 903 can perform the ordinary one-frame-exposure process. The half mirror 904 transmits about a half of the incident light and reflects the other half of the incident light. Even with such a configuration adopted, a number of frames can also be subjected to the exposure process continuously.

Next, the configuration and operation of a motion sensor device according to this embodiment will be described in further detail with reference to FIG. 10 again.

The light sources 702 and 703 are configured to emit light rays with approximately the same intensity. The light sources 702 and 703 may also be configured to emit invisible light such as a near-infrared ray, not just visible light. The light sources 702 and 703 may be, but do not have to be, LED light sources. Instead, the light sources 702 and 703 may also be point light sources or any other kind of light sources with a three-dimensionally biased intensity distribution. For example, laser light sources may also be used. A laser light source emits parallel light, and therefore, its light intensity does not vary three-dimensionally. However, a laser light source may also be used if the parallel light is turned into scattering light by combining the laser light source with a diffuser, for example. Optionally, a single light source unit may be formed by combining multiple light-emitting devices together.

The image sensor 701 includes a storage section which temporarily stores electric charges on a pixel-by-pixel basis. Thus, even before image data obtained by capturing an $n^{th}$ frame is retrieved, an $(n+1)^{th}$ frame can be captured. If an increased number of storage sections are provided inside the image sensor 701, the exposure process can be carried out on three or more frames continuously. The image sensor 701 may be a special kind of sensor which can carry out the exposure process on even-numbered lines and on odd-numbered lines separately from each other. Although the image sensor 701 is typically a CMOS image sensor or a CCD image sensor, this is only an example and any other kind of image sensor may also be used.

The controller 710 may be implemented as a CPU or any other kind of semiconductor integrated circuit, or a combination thereof. The controller 710 controls the image sensor 701 and light sources 702, 703 to make the image sensor 701 capture a first frame with light emitted from the first light source 702 at a first time and make the image sensor 701 capture a second frame with light emitted from the second light source 703 at a second time. The controller 710 further performs masking processing on a first image gotten by capturing the first frame and on a second image gotten by capturing the second frame based on a difference between the first and second images. And the controller 710 obtains information about the distance to the object 705 based on the first and second images that have been subjected to the masking processing.

The masking processing of this embodiment is processing of removing an area in which the (absolute value of the) difference between the luminance value of a pixel in the first image and that of its corresponding pixel in the second image is smaller than a threshold value from the first and second images. In this description, to "remove" a certain area from an image means changing the luminance value of that area into a value which is even closer to zero. The luminance value of a pixel in the area to be removed is typically changed into zero but may also be changed into another value close to zero. Situations where the difference between two luminance values is smaller than the threshold value is supposed to include a situation where the difference between the ratio of two luminance values and one is smaller than the threshold value.

As elements for performing such processing, the controller 710 includes a difference creating section 711 which generates an image representing the difference between two images, a masking processing section 712 which performs the masking processing, and a distance calculating section 713 which generates information about the distance to the object 705 based on the first and second images that have been subjected to the masking processing. These functional blocks may be implemented as a part of a circuit that forms the controller 710 or as a CPU which executes a computer program defining the processing of this embodiment.

Figure 13:
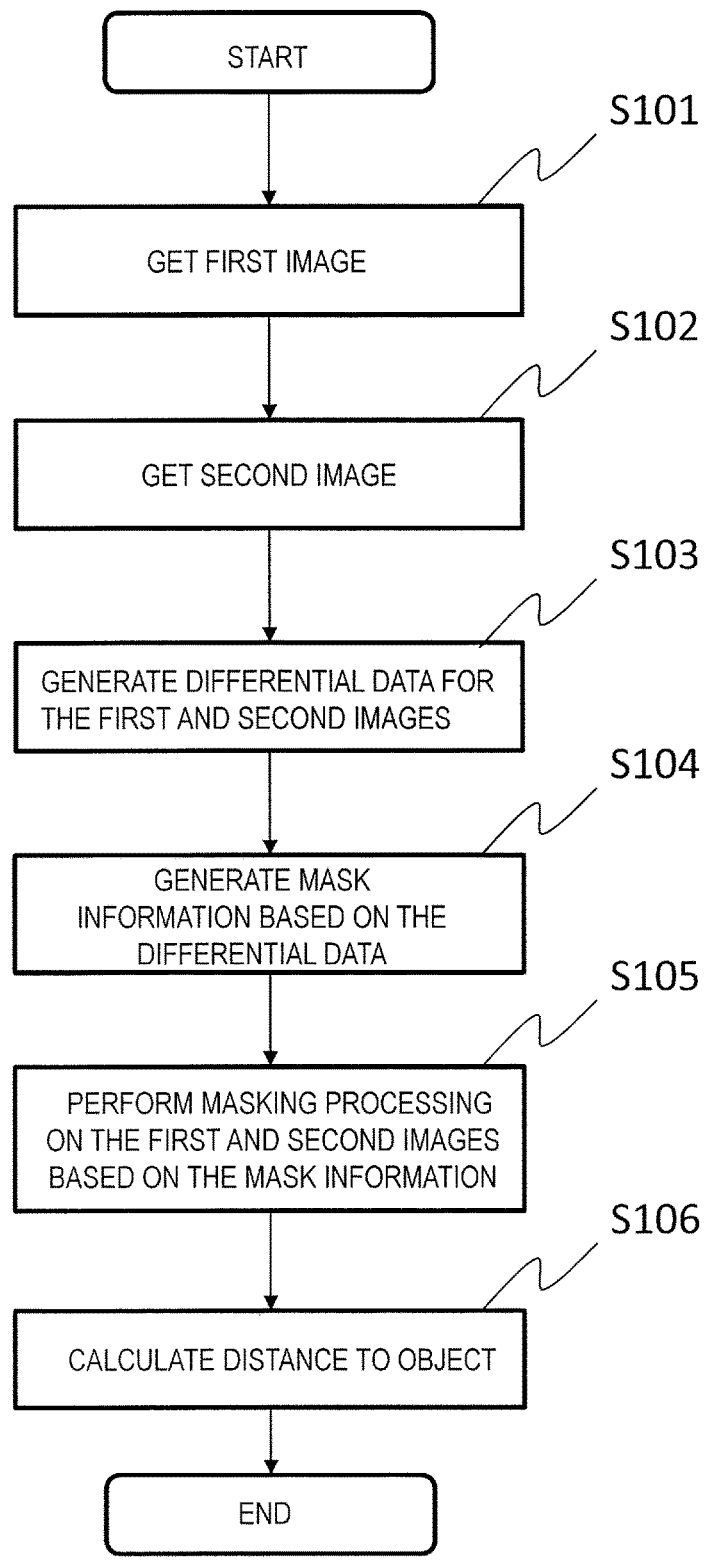
FIG. 13 A flowchart showing how a controller 710 operates according to the first embodiment.

Next, it will be described with reference to FIG. 13 exactly how the controller 710 operates. FIG. 13 is a flowchart showing how the controller 710 operates.

First of all, in a first exposure period of the image sensor 701, the controller 710 gets a first image by making the image sensor 701 capture a first image frame with light emitted from the light source 702 (in Step S101). Next, in a second exposure period of the image sensor 701, the controller 710 gets a second image by making the image sensor 701 capture a second image frame with light emitted from the light source 703 (in Step S102).

On these two images, the images of the external light source 706 have approximately the same luminance levels. The subject (705) image, on the other hand, has the higher luminance on the second image which has been gotten with light emitted from the light source 703 that is located at the closer physical distance from the subject 705.

After having been subjected to the exposure process, the first and second image frames are retrieved and transferred and then sent to the difference creating section 711 and the masking processing section 712. In this case, if the read operation is controlled so that corresponding pixels in the first and second image frames are scanned at close timings, then the space to be used after that by respective processing sections in a storage section such as a frame memory can be cut down.

The difference creating section 711 generates differential data for the first and second images (in Step S103). More specifically, the difference creating section 711 calculates the absolute value of the difference between the luminance value of each pixel in the first image and that of its corresponding pixel in the second image and generates differential data by associating that result with information about the location of the pixel. Then, the difference creating section 711 passes the differential data to the masking processing section 712.

Based on the differential data supplied from the difference creating section 711, the masking processing section 712 generates mask information to distinguish an area where the difference exceeds a predetermined threshold value from an area where the difference does not exceed the threshold value (in Step S104). The mask information may be a piece of information in which the location of a pixel is associated with a numerical value (e.g., zero or one) indicating whether or not the difference between the luminance values of that pixel exceeds the threshold value. However, the data format of the mask information is not limited to any particular one. The mask information does not have to be generated on a pixel-by-pixel basis but may also be generated on the basis of an area comprised of multiple proximate pixels. For example, the mask information may be a piece of information indicating, on the basis of a pixel block comprised of multiple pixels, whether or not the average value of the differences between the luminance values exceeds the threshold value.

Based on the mask information thus generated, the masking processing section 712 performs masking processing on the first and second images (in Step S105). An area in which the difference does not exceed the threshold value according to the mask information may be regarded as having no difference. That is why to neglect the luminance value of such an area in which the difference does not exceed the threshold value, the masking processing section 712 replaces the luminance values of pixels in question in the first and second images with a low value such as zero. Such processing will be hereinafter referred to as "masking processing". The masking processing section 712 passes the first and second images that have been subjected to the masking processing as first and second masked images, respectively, to the distance calculating section 713.

Based on the first and second masked images provided, the distance calculating section 713 calculates the distance to the object (in Step S106). Specifically, the distance calculating section 713 searches the first and second masked images for an area where the object image is located, converts the luminance ratio in that area into distance information, and then outputs it as 3D motion information. Data for converting the luminance ratio into distance information may be stored in advance in a storage medium such as a memory (not shown). The data may have the form of a table or a function.

If the target area of motion sensing is limited to an area where a luminance difference is created by the light rays emitted from the two light sources 702 and 703 by performing these operations, a motion sensor which can operate properly with the influence of background light lessened is realized.

In the embodiment described above, the first and second light sources 702 and 703 are supposed to be arranged at equal distances from the image sensor 701. However, this is only an example and such an arrangement does not have to be adopted. Alternatively, the second light source 703 may also be arranged closer to the image sensor 701 than the first light source 702 is. Also, not all of the image sensor 701 and the first and second light sources 702 and 703 have to be arranged in line but some of them may be arranged out of line. In this manner, the light sources 702 and 703 may be arranged asymmetrically with respect to the image sensor 701. Furthermore, the optical output powers of these two light sources 702 and 703 do not have to be the same but may be different from each other.

(Embodiment 2)

Next, a second embodiment of the present disclosure will be described.

According to the first embodiment described above, if the subject is located at or beyond a certain distance, then the difference in luminance between the reflected light rays coming from multiple light sources is not so wide that the luminance difference could not be detected due to some noise component such as light shot noise or dark current noise. As a result, mask separation processing could not get done sufficiently in such a situation, which is a problem. According to this embodiment, this problem is overcome by setting the optical output powers of the two light sources to be different ones and by amplifying the luminance level of an image which has been gotten while light is being emitted from a light source at the lower output power.

Figure 14:
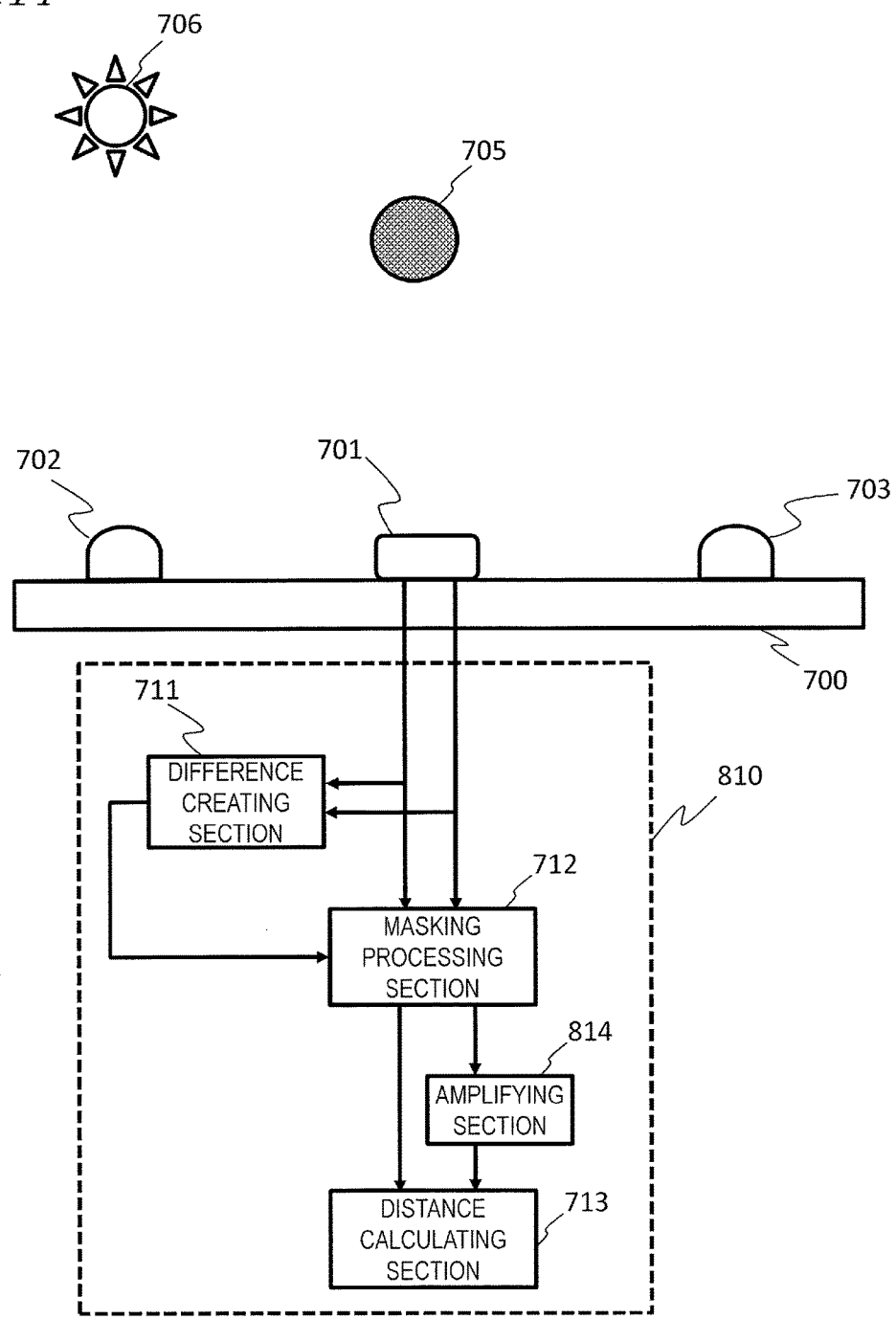
FIG. 14 Illustrates schematically a configuration for a motion sensor device according to a second embodiment of the present disclosure.

FIG. 14 illustrates a general configuration for a motion sensor device according to this embodiment. In FIG. 14, any component also shown in FIG. 10 and having substantially the same function as its counterpart is identified by the same reference numeral as its counterpart's and description thereof will be omitted herein. The controller 810 of this embodiment includes an amplifying section 814 which amplifies the luminance level of the second image that has been subjected to the masking processing.

Figure 15:
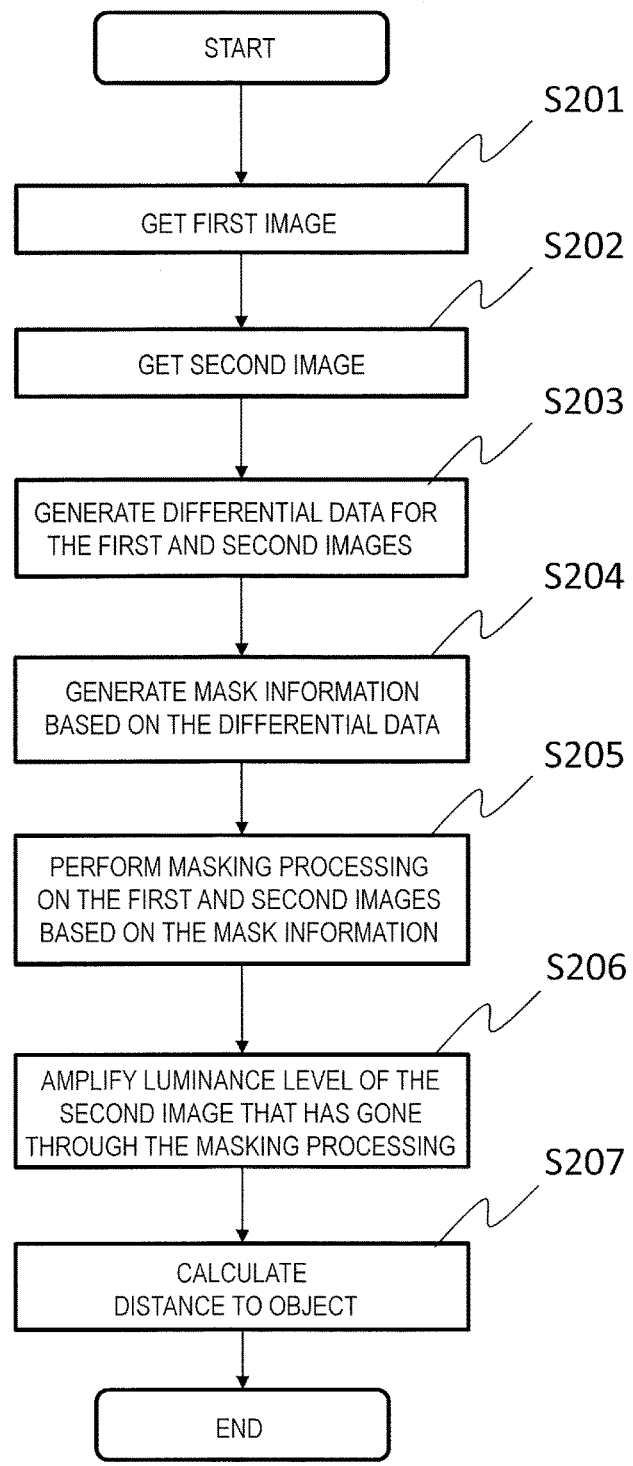
FIG. 15 A flowchart showing exactly how a controller 810 according to the second embodiment operates.

Next, it will be described with reference to FIG. 15 how the controller 810 of this embodiment operates. FIG. 15 is a flowchart showing exactly how the controller 810 of this embodiment operates.

First of all, at a first exposure timing for the image sensor 701, the controller 810 gets a first image by making the image sensor 701 capture a first image frame with light emitted from the light source 702 (in Step S201). Next, at a second exposure timing for the image sensor 701, the controller 810 gets a second image by making the image sensor 701 capture a second image frame with light emitted from the light source 702 (in Step S202). In this process step, the optical output power of the light source 703 is set to be lower than that of the light source 702.

In this description, the "optical output power" refers herein to the total quantity of energy of the light emitted in a single exposure period by the image sensor 701. The optical output power can also be said to be the "quantity of light emitted". The optical output power can be lowered either by shortening the light emission period during the exposure period or by replacing the light-emitting device with a device with a smaller emission power (or wattage).

In the two image frames, an image of the external light source 706 is shot at the same luminance level. On the other hand, an image of the object 705 is shot so that the second image frame has the lower luminance due to a difference in output power between the light sources 702 and 703. As a result, a difference is created in the luminance of the object (705) image between the first and second image frames.

After having been subjected to the exposure process, the first and second image frames are retrieved and transferred and then sent to the difference creating section 711 and the masking processing section 712.

FIG. 16 illustrates how to perform masking processing according to this embodiment. Specifically, FIG. 16(a) illustrates an exemplary first image to be obtained by capturing a first image frame. FIG. 16(b) illustrates an exemplary second image to be obtained by capturing a second image frame. And FIG. 16(c) illustrates an example of a first image that has been subjected to the masking processing. In FIGS. 16(a) and 16(b), the object images 1001 and 1011 are human hand images. The object 705 shown in FIG. 14 corresponds to a tip of the middle finger of this hand. The object image 1011 that has been shot with the light source 703 with the relatively low output power has been shot at the lower luminance than the image 1001. The images 1002 and 1012 shown in FIGS. 16(a) and 16(b) are images of two straight tube fluorescent lamps. The images 1002 and 1012 correspond to the external light source 706 shown in FIG. 14. The images 1002 and 1012 have approximately the same luminance levels.

The difference creating section 711 generates differential data for the first and second images (in Step S203). Then, the differential data is sent to the masking processing section 712.

Based on the differential data supplied from the difference creating section 711, the masking processing section 712 generates mask information (in Step S204). In FIG. 16(c), the mask information is represented by an image. In FIG. 16(c), an area where the difference exceeds the threshold value is expressed in white, while an area where the difference does not exceed the threshold value is expressed in black. By reference to the mask information, the masking processing section 712 performs masking processing on the first and second images (in Step S205). That is to say, to neglect the luminance of an area where there should be no difference according to the decision result, the masking processing section 712 replaces the luminance values of pixels in question with a low value such as zero. Then, the masking processing section 712 passes the first image that has been subjected to the masking processing as a first masked image to the distance calculating section 713. On the other hand, the masking processing section 712 passes the second image that has been subjected to the masking processing as a second masked image to the amplifying section 814.

The amplifying section 814 amplifies the luminance level of the second masked image according to the output ratio of the light sources 702 and 703 (in Step S206). In this description, the processing of adjusting the luminance in accordance with the difference (or the ratio) in optical output power between two light sources as is done in this amplification processing will be hereinafter referred to as "luminance correction processing". The amplifying section 814 passes the second image that has been subjected to the luminance correction processing to the distance calculating section 713.

Through the luminance correction processing, the distance calculating section 713 can obtain two images that are substantially the same as what would be obtained when light is emitted at the same output power from the light sources 702 and 703. Then, based on the first image that has been subjected to the masking processing and the second image that has been subjected to the luminance correction processing, the distance calculating section 713 calculates the distance to the object (in Step S207).

By adopting such a configuration, the influence of background light can be lessened in an even broader range than in the first embodiment, and a motion sensor with good performance is realized.

In the embodiment described above, only the luminance level of the second image is supposed to be amplified by the amplifying section 814. However, the same effects can also be achieved either by lowering the luminance level of the first image or by adjusting the luminance levels of both of the first and second images. That is to say, the effects of this embodiment can also be achieved by performing the luminance correction processing based on the difference in optical output power between the first and second light sources on at least one of the first and second images that have been subjected to the masking processing.

Also, as long as the same effects as the ones to be achieved by performing the luminance correction processing can be achieved eventually, distance information may also be obtained by any other method. For example, the same results can also be obtained even by correcting a table or function for converting the distance based on the luminance ratio according to the output ratio of multiple light sources. In this embodiment, it is important to make the luminance correction after the masking processing so that the luminance ratio for obtaining the distance becomes an appropriate value. No matter what method is adopted, as long as the results obtained are equivalent to what is obtained by making such a luminance correction, it can be said that the luminance correction has been done.

In the embodiment described above, a motion sensor device with two light sources has been described for the sake of simplicity. Actually, however, it is particularly effective to use a configuration with three light sources such as the one shown in FIG. 17.

Figure 17:
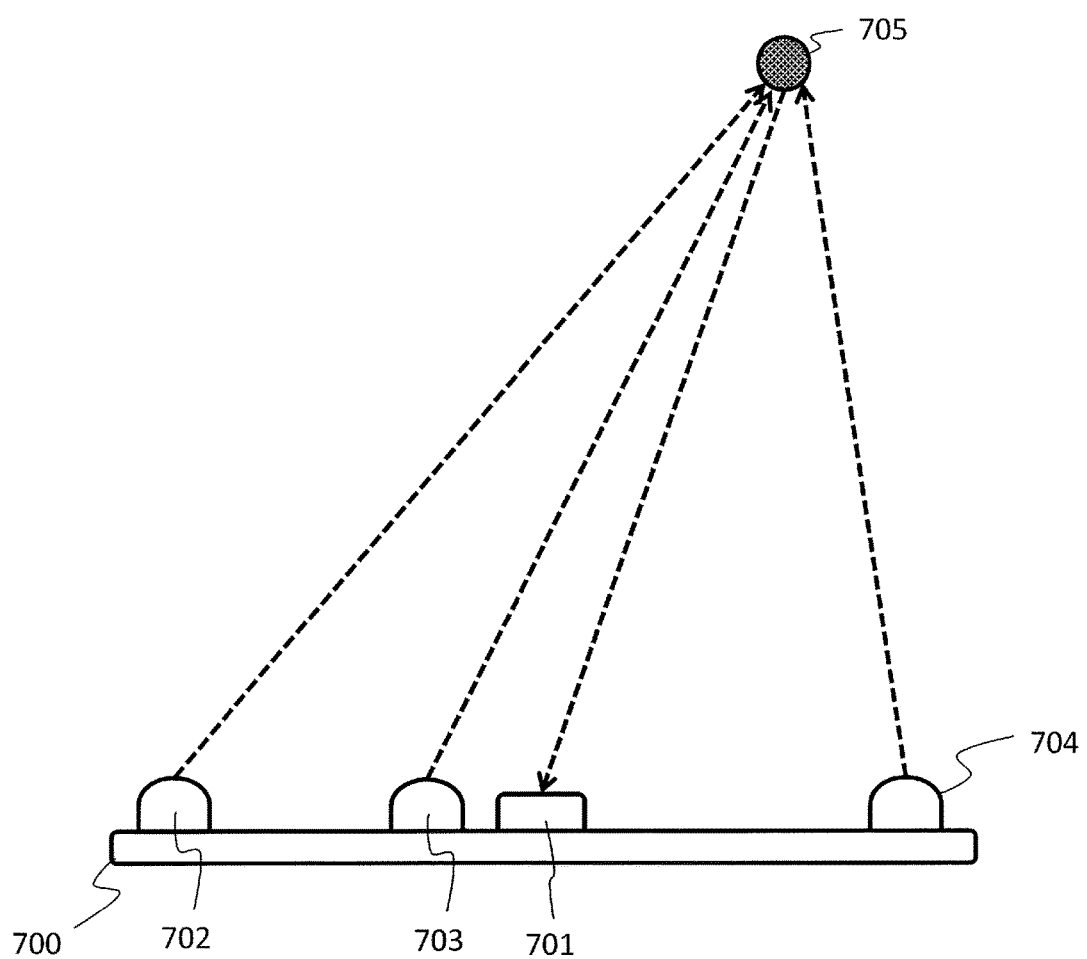
FIG. 17 Illustrates an exemplary configuration for a motion sensor device with three light sources 702, 703 and 704.

FIG. 17 illustrates an exemplary configuration for a motion sensor device with three light sources 702, 703 and 704. The image sensor 701 and first and second light sources 702 and 703 are the same as the ones shown in FIG. 14. The third light source 704 emits light at approximately the same output power as the first light source 702. In this example, the second light source 703 is arranged closer to the image sensor 701 than the first and third light sources 701 and 704 are. In this manner, these light sources 702, 703 and 704 are arranged asymmetrically with respect to the image sensor 701. Although not shown in FIG. 17, the controller 810 shown in FIG. 14 is actually connected to the image sensor 701 and light sources 702, 703 and 704.

In this example, the controller 810 can perform the same processing as what has been described above using the second image frame that has been captured with light emitted from the second light source 703 and the third image frame that has been captured with light emitted from the third light source 704. That is to say, after the first and second frames have been captured, the controller 810 makes the image sensor 701 capture the third frame with light emitted from the third light source 704 at a third exposure time. Then, the controller 810 performs masking processing on the second and third images based on the difference between the second image obtained by capturing the second frame and the third image obtained by capturing the third frame. Furthermore, the controller 810 also performs luminance correction processing based on the difference in optical output power between the second and third light sources on at least one of the second and third images that have been subjected to the masking processing. As a result, information about the distance to the object can be generated based on the luminance ratio of the object obtained from the second and third images that have been subjected to the luminance correction processing.

In this exemplary configuration, as for an object which is located on the right-hand side of the center in FIG. 17, it is appropriate to use the luminance ratio between the light rays emitted from the first and second light sources 702 and 703 in order to calculate the distance uniquely. In that case, the luminance derived from the second light source 703 becomes relatively high. On the other hand, as for an object which is located on the left-hand side of the center in FIG. 17, it is appropriate to use the luminance ratio between the light rays emitted from the second and third light sources 703 and 704 in order to calculate the distance uniquely. In that case, the luminance derived from the light source 703 becomes relatively high.

Considering this respect, it is convenient for the overall system to set the output of a light source that is located physically close to the image sensor 701 (such as the second light source 703 shown in FIG. 17) to be lower than that of any other light source. The reason is that in making a division operation in order to obtain the luminance ratio, the significant accuracy of the result of the division is limited by either the divisor or the dividend that has the lower accuracy. The accuracy of the luminance value of each pixel in the image that has been obtained by capturing is constrained by light shot noise, which is proportional to the root of the luminance. That is why to equalize the degrees of accuracy of the divisor and the dividend with each other would lead to achieving the same degree of accuracy at a lower optical output power.

(Embodiment 3)

Next, a third embodiment of the present disclosure will be described.

According to the second embodiment described above, the background light area can be masked in a region where the luminances of multiple light sources do not simply become significantly different (e.g., at a distant location). At a short distance, however, it is still impossible to detect an area where the luminance difference decreases depending on the distance or angle, which is a problem. This third embodiment provides a measure for overcoming such a problem.

Figure 18:
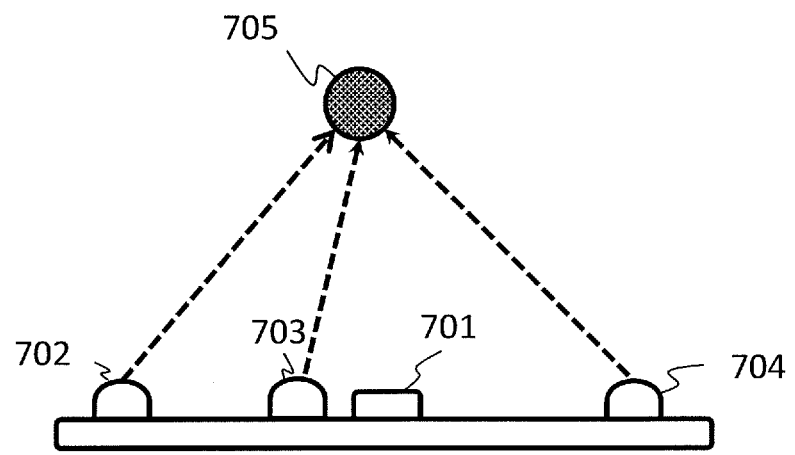
FIG. 18 Illustrates a situation where no luminance difference is created in the configuration of the second embodiment with three light sources.

FIG. 18 illustrates a situation where no luminance difference is created in the configuration of the second embodiment with three light sources. The light source 703 emits light at a lower output power than the light sources 702 and 704. In the relative arrangement shown in FIG. 18, the intensity of the light emitted from the light source 703 is lower than that of the light emitted from the light sources 702 and 704 but the luminances of a particular portion of the object may be approximately the same in all of the three images, because the object 705 is located physically close to the light source 703. As a result, in two images selected from these three, their luminance ratio becomes close to zero and it becomes difficult to distinguish their luminance ratio from the luminance by the external light source. If the masking processing of the second embodiment were performed in such a state, even an area of the object, of which the distance needs to be measured, would be masked and excluded from the measuring processing unintentionally, which is a problem.

FIG. 19(a) illustrates a masked image which was generated when a hand image at a short distance was processed by actually using the device of the second embodiment. It can be seen that a center portion of a finger which should have been the object of measurement was masked unnecessarily. In this case, the finger which should have been represented as a single one looked as if there were two fingers there, because the area was divided unintentionally. That is a problem.

According to this embodiment, such a problem can be overcome.

First of all, it is only when the object is located relatively close to either the image sensor 701 or any of the light sources 702 to 704 that such a significant difference is created in the intensity of reflected light coming from the light source depending on their relative arrangement. An object located at a short distance has such a property as to create a significant difference in luminance between the light sources within the area of the object image captured.

Figure 20:
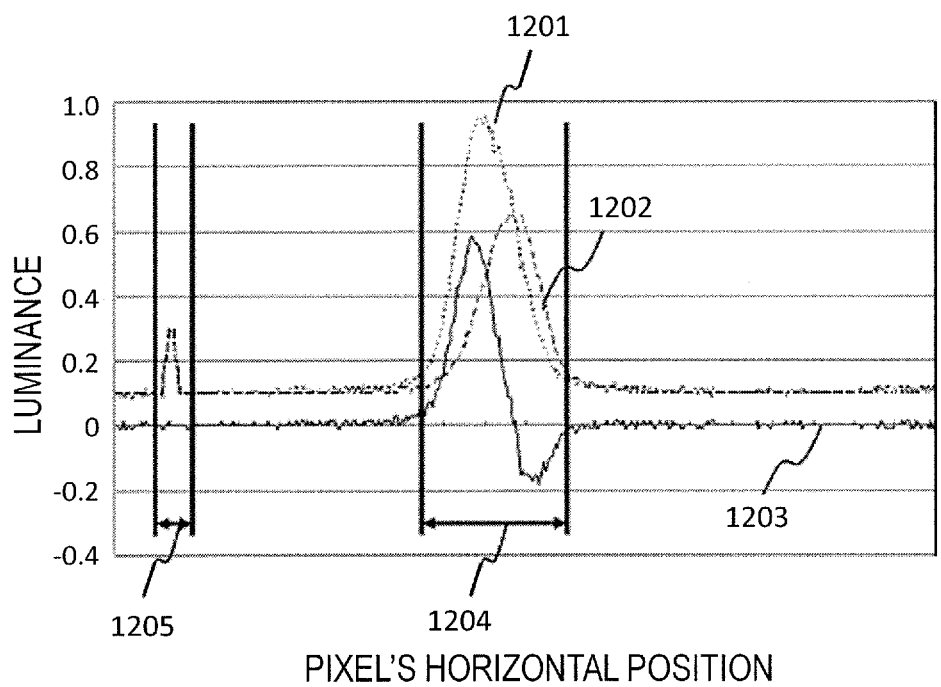
FIG. 20 A graph showing the luminances of a particular horizontal line in multiple images which were captured by shooting a finger that was located at a short distance from the motion sensor device shown in FIG. 18.

FIG. 20 is a graph showing the luminances of a particular horizontal line in multiple images which were captured by shooting a finger that was located at a short distance from the motion sensor device shown in FIG. 18. In FIG. 20, shown are the luminance 1201 of an image that was shot with light emitted from the light source 703, the luminance 1202 of an image that was shot with light emitted from the light source 704, and the difference 1203 between the luminances 1201 and 1202. Also, the range 1204 shown in FIG. 20 indicates an area where the object was located, and the range 1205 indicates an area where the external light source was located.

In the external light source range 1205 indicating the area where the external light source was located, there are peaks of the luminance levels for both of the luminances 1201 and 1202. However, these peaks are at the same luminance level between the two images, and therefore, are hardly sensible as the luminance difference 1203.

In the object range 1204 indicating the area where the object was located, there are a range where the luminance difference 1203 has a positive value and a range where the luminance difference 1203 has a negative value. At the boundary between these two ranges, the luminance level becomes equal to zero. And in the vicinity of this point, it is impossible to tell the object from the external light source. In an object of a shape with a lot of flat portions, in particular, the area with a luminance level close to zero is so broad that it is even more difficult to make the decision.

Looking at the whole object range 1204, it can be seen that the luminance 1201 is high and the luminance difference 1203 has a positive value at the left end of the range and the luminance 1202 is high and the luminance difference 1203 has a negative value at the right end of the range. That is why the controller of this embodiment pairs an area in which the luminance difference 1203 has a positive value that is equal to or greater than a predetermined value and which includes a point where the difference 1203 has a local maximum value with an area in which the luminance difference 1203 has a negative value that is equal to or smaller than another predetermined value and which includes a point where the difference 1203 has a local minimum value. And between those areas that are paired with each other, even if the luminance difference 1203 has a value of around zero, the controller still carries out processing with that area estimated to be an object area. In this description, such an area that is estimated to be an object area will be hereinafter referred to as an "estimated object area".

FIG. 19(b) illustrates a masked image to be obtained when subjected to such processing. It can be seen that it is possible in this manner to avoid dividing the image representing the same finger. Although there are some portions with somewhat imperfect profile information, there should be no problem in partitioning the areas on a finger basis in practice, for example. The present inventors confirmed that the motion sensor device could perform the recognition operation with no problem at all, because major areas for calculating the luminance ratio between the respective areas could be secured safely.

Next, a configuration for a motion sensor device which performs such processing will be described.

Figure 21:
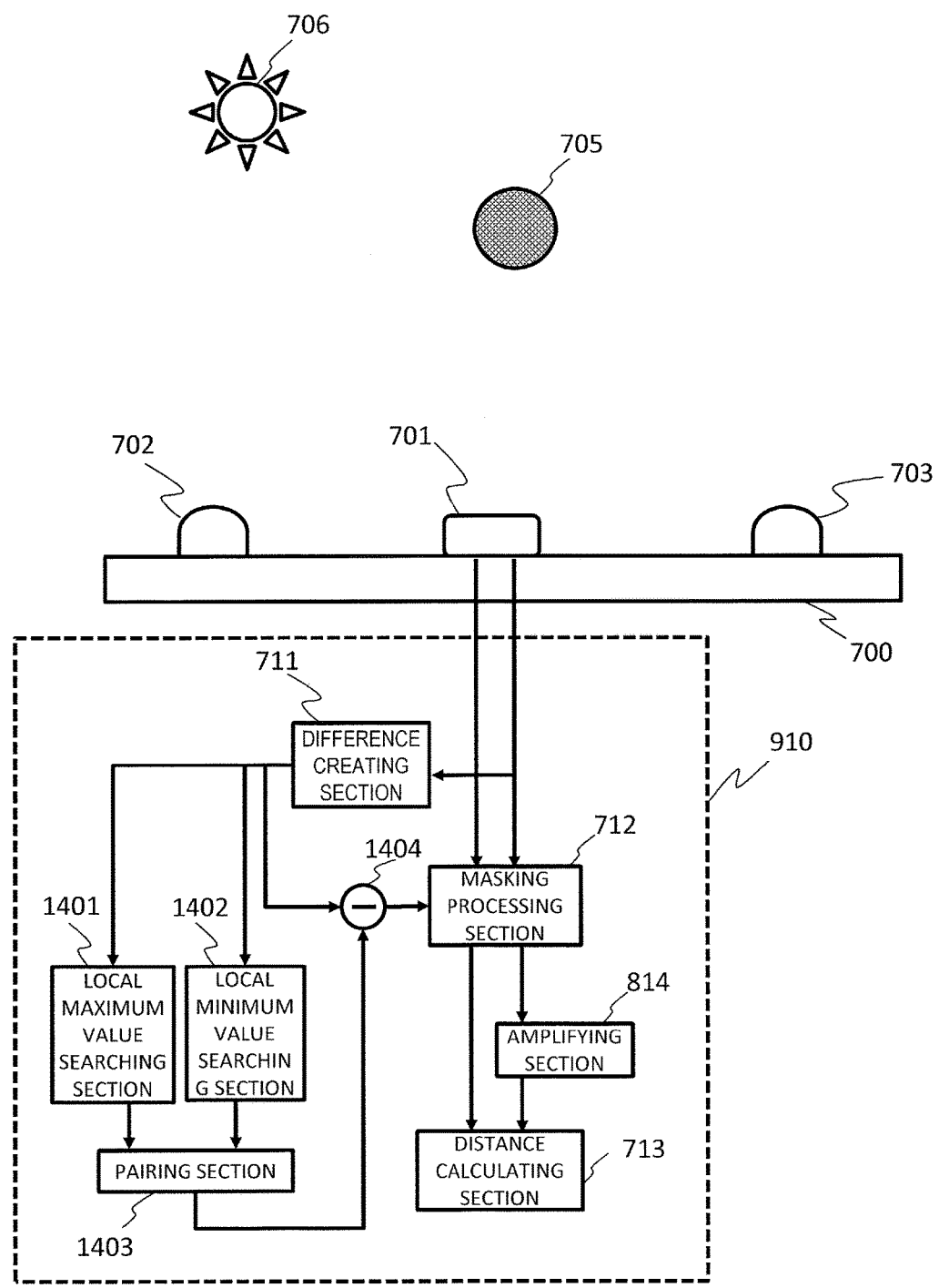
FIG. 21 Illustrates a configuration for a motion sensor device according to a third embodiment of the present disclosure.

FIG. 21 illustrates a configuration for a motion sensor device according to this embodiment. In this example, a configuration with two light sources 702 and 703 is supposed to be adopted for the sake of simplicity. However, this configuration may also be expanded into the one with three light sources as described above. In FIG. 21, any component also shown in FIG. 14 and having substantially the same function as its counterpart is identified by the same reference numeral as its counterpart's and description thereof will be omitted herein. The controller 910 of this embodiment includes not only every component of the second embodiment but also a local maximum value searching section 1401, a local minimum value searching section 1402, a pairing section 1403 and a mask subtracting section 1404 as well.

Figure 22:
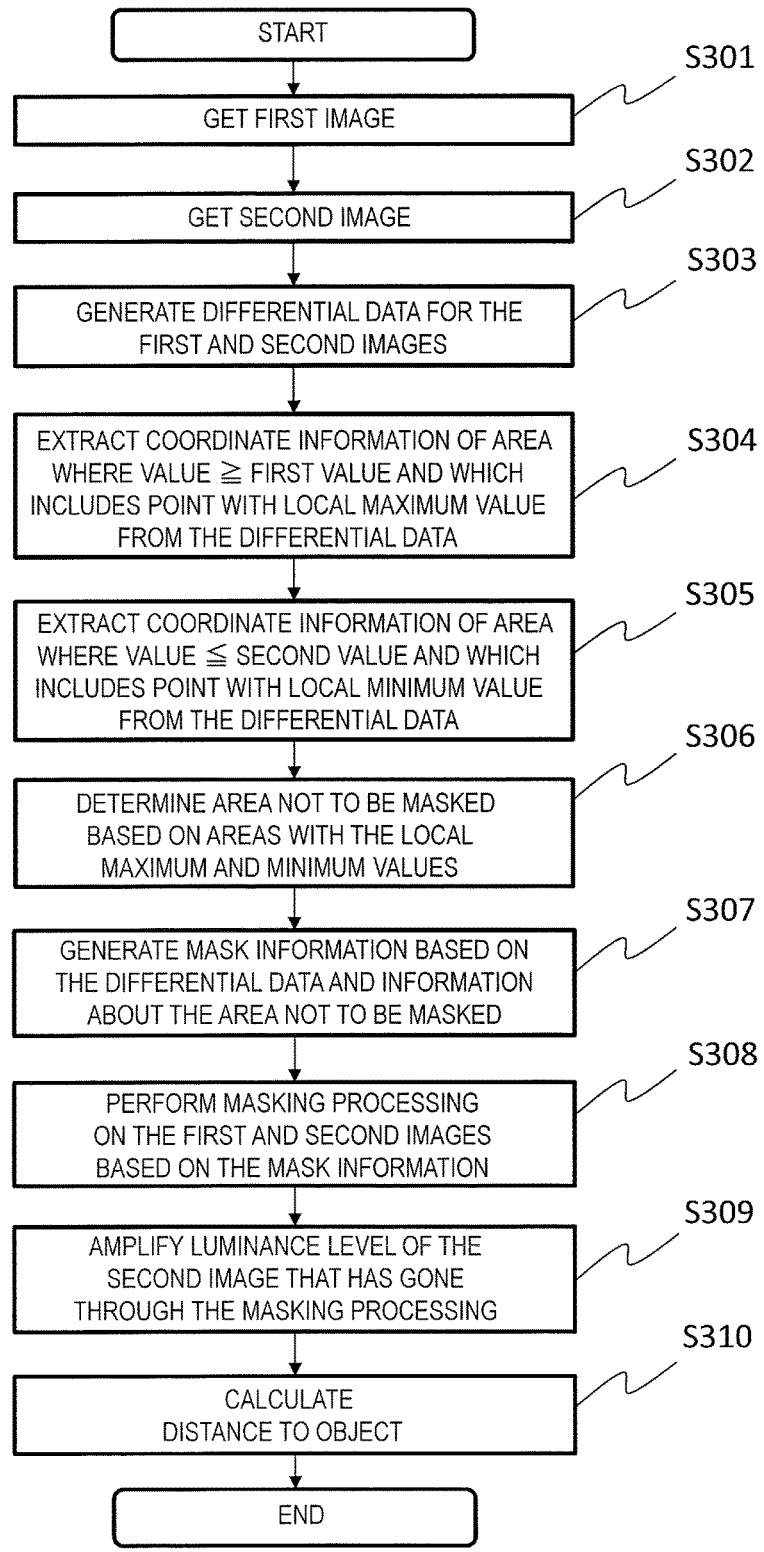
FIG. 22 A flowchart showing exactly how a controller 910 according to the third embodiment operates.

Next, it will be described with reference to FIG. 22 how the controller 910 of this embodiment operates. FIG. 22 is a flowchart showing exactly how the controller 910 of this embodiment operates.

First of all, at a first exposure timing for the image sensor 701, the controller 910 gets a first image by making the image sensor 701 capture a first image frame with light emitted from the light source 702 (in Step S301). Next, at a second exposure timing for the image sensor 701, the controller 910 gets a second image by making the image sensor 701 capture a second image frame with light emitted from the light source 703 (in Step S302). In this process step, the optical output power of the light source 703 is set to be lower than that of the light source 702. The optical output power can be lowered either by shortening the light emission period during the exposure period or by replacing the light-emitting device with a device with a smaller emission power (or wattage).

In the two image frames, an image of the external light source 706 is shot at the same luminance level. On the other hand, an image of the object 705 is shot so that the second image frame has the lower luminance due to a difference in output power between the light sources 702 and 703. As a result, a difference is created in the luminance of the object (705) image between the first and second image frames.

After having been subjected to the exposure process, the first and second image frames are retrieved and transferred and then sent to the difference creating section 711 and the masking processing section 712.

The difference creating section 711 generates differential data for the first and second images (in Step S303). Then, the differential data is sent to the local maximum value searching section 1401, the local minimum value searching section 1402 and the masking processing section 712.

The local maximum value searching section 1401 extracts an area where the value is equal to or greater than a first value and which includes a point with a local maximum value from the differential data and outputs the coordinate information of that area as local maximum value coordinate information to the pairing section 1403 (in Step S304). The local minimum value searching section 1402 extracts an area where the value is equal to or smaller than a second value and which includes a point with a local minimum value from the differential data and outputs the coordinate information of that area as local minimum value coordinate information to the pairing section 1403 (in Step S305). In this case, the first value is a positive value close to zero and the second value is a negative value close to zero.

The pairing section 1403 determines a range where the extracted area with the local maximum value and the extracted area with the local minimum value are excluded from the areas to be masked (in Step S306). Specifically, the pairing section 1403 chooses coordinates to make pairs from the coordinates included in the local maximum value coordinate information and from the coordinates included in the local minimum value coordinate information, and passes the coordinate information of the estimated object area between those coordinates to the mask subtracting section 1404. In this process step, local maximum value coordinate information and local minimum value coordinate information are discarded if there are no corresponding pairs in those pieces of information.

The mask subtracting section 1404 generates mask information based on the differential data supplied from the difference creating section 711 and the coordinate information supplied from the pairing section 1403 to indicate the area not to be masked (in Step S307). More specifically, the mask subtracting section 1404 generates mask information by excluding a range corresponding to the area not to be masked from a range of the differential data where the value is smaller than a predetermined threshold value and passes the mask information to the masking processing section 712.

Based on the mask information provided by the mask subtracting section 1404, the masking processing section 712 performs masking processing on the first and second images (in Step S308). Specifically, to neglect the luminance value of an area that has been determined to have no difference, the masking processing section 712 replaces the luminance values of pixels in question with a low value such as zero. Then the masking processing section 712 passes the first and second images that have been subjected to the masking processing as first and second masked images to the distance calculating section 713 and the amplifying section 814, respectively.

The amplifying section 814 amplifies the luminance level of the second masked image according to the output ratio of the light sources 702 and 703 (in Step S309). Then, the amplifying section 814 passes the second image that has been subjected to the luminance correction processing to the distance calculating section 713.

The distance calculating section 713 calculates the distance to the object based on the first image that has been subjected to the masking processing and the second image that has been subjected to the luminance correction processing (in Step S310).

By performing these processing steps, the difference in luminance between light rays reflected from an object at a distance can be widened, and an erroneous detection which would be caused by an area with no luminance difference in a situation where there is an object near the motion sensor device can be remedied.

Optionally, the performance can be further improved by turning ON or OFF the background light removing function itself according to this embodiment or by making the threshold value changeable dynamically while a mask is being made or an extreme value is being searched for. For example, if the object is located so close as to produce intense reflected light, the exposure period of the image sensor needs to be shortened and the analog gain value needs to be lowered. In that case, the reflection level of the external light source will decrease so much that the electric power would be just wasted even if the background light removing function were turned ON.

In such a situation, sensing can be made by various methods. According to one method, the results of an automatic exposure control (i.e., control of exposure period and lens stop settings), autofocusing and an automatic gain control by the image sensor are used. Based on these results, the shooting luminance level and the distance to the object can be detected. The background light removing function can be turned ON or OFF and the threshold value can be changed by reference to at least one of these pieces of information.

According to another method, the motion sensor's own subject distance measuring function is used. The intensity of the light reflected from the subject can be estimated based on the subject distance and size that have been obtained based on the luminance ratio. If the photometric stereo method is used to calculate the luminance ratio, information about the material property of the target (such as its reflectivity) can also be obtained. That is why by making reference to these pieces of information, the intensity of the light reflected from a subject can be estimated even more accurately. And by reference to these pieces of information, the background light removing function can be turned ON or OFF and the threshold value can be changed.

As can be seen, the controller of a motion sensor device according to the present disclosure may decide whether or not to perform the masking processing and may change the coefficient (threshold value) for use in making calculations for the masking processing based on at least one of the optical output power of the first light source 702, the optical output power of the second light source 703, the exposure period of the image sensor 701, the gain of the image sensor 701, the focusing state of the image sensor 701 and the lens stop setting. Alternatively, the controller may also decide whether or not to perform the masking processing and may change the coefficient for use to perform the masking processing by reference to at least one of information about the distance to the object, information about its size, and information about its material property.

(Embodiment 4)

As a method for configuring the device of the third embodiment, the processing may be carried out just as already described for the third embodiment using a Neumann CPU, for example. However, if a Neumann CPU is used to perform image processing, the power efficiency achieved would be low. In addition, since the processing of the third embodiment such as pairing should be carried out by scanning the image horizontally both from the left and from the right, the execution time will vary depending on the data, which is a problem.

This embodiment relates to a circuit which was invented to overcome these problems. A circuit according to this embodiment is a physical integrated circuit which is implementable as reconfigurable logic such as an FPGA (field programmable gate array). Such an integrated circuit which can operate using reconfigurable logic as in this embodiment may be a circuit which operates by being loaded with circuit information that is stored in a storage medium such as a flash memory when turned ON.

Figure 23:
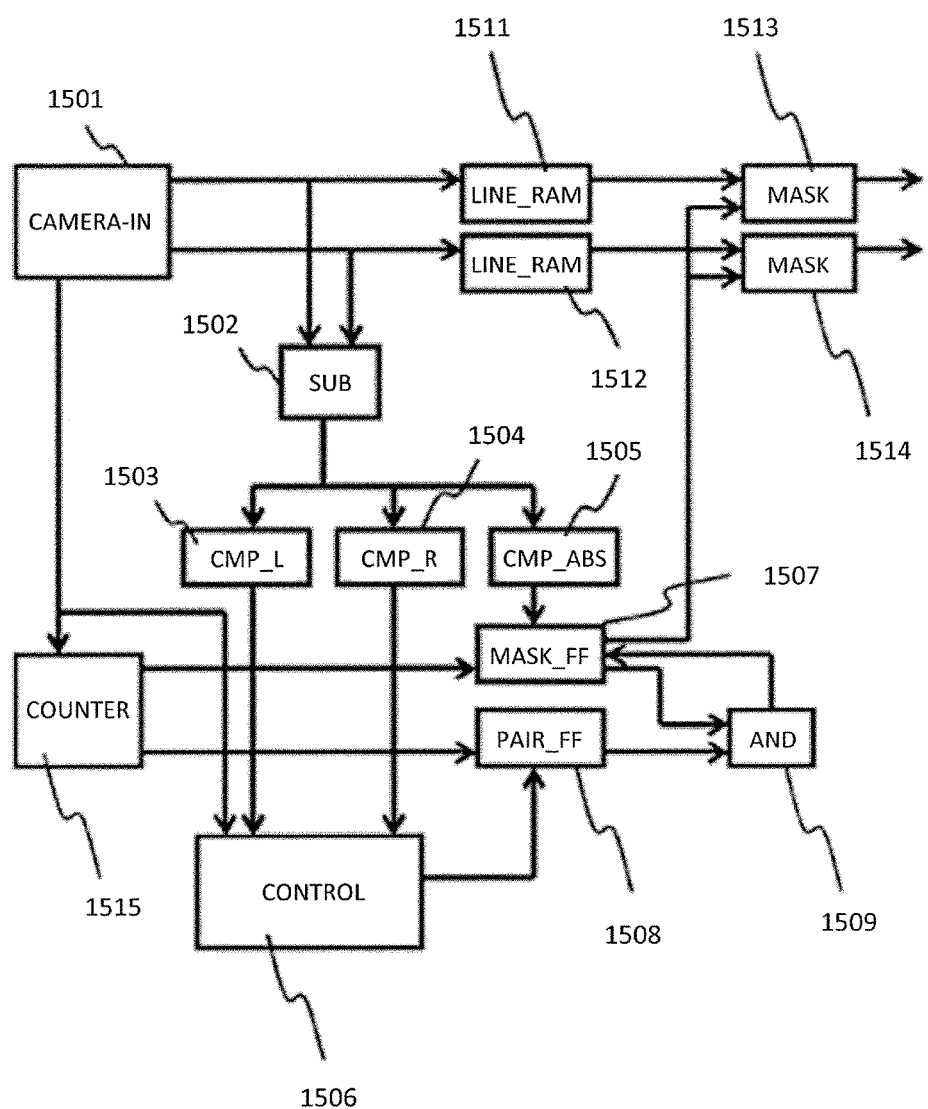
FIG. 23 Illustrates a configuration for a circuit according to a fourth embodiment of the present disclosure.

FIG. 23 illustrates a configuration for a circuit according to this embodiment. This circuit includes a camera input section (CAMERA-IN) 1501 through which a camera signal is input, a difference creating section (SUB) 1502 which calculates the difference between two images that have been input from a camera, a local maximum value searching section (CMP_L) 1503 including a comparator which determines, by reference to a single line of the image, whether or not the left edge of the subject (i.e., the differential signal) is equal to or greater than a certain threshold value, a local minimum value searching section (CMP_R) 1504 including a comparator which determines, by reference to a single line of the image, whether or not the right edge of the subject (i.e., the differential signal) is equal to or smaller than a certain threshold value, and a mask generating section (CMP_ABS) 1505 including a comparator which determines whether or not the absolute value of the luminance difference is equal to or smaller than a certain threshold value. The circuit further includes a counter section (COUNTER) 1515 which counts the number of pixels in a line, a controller (CONTROL) 1506, flip-flops (MASK_FF) 1507, of which the number is equal to or greater than the number of pixels in a single line of an image and which functions as a mask information storage section, flip-flops (PAIR_FF) 1508, of which the number is equal to or greater than the number of pixels in a single line of an image and which functions as a pairing information storage section to temporarily store a pairing range for the local maximum and local minimum values, a mask subtracting section (AND) 1509 which calculates the AND of the mask information stored in the flip-flops 1507 and the pairing information stored in the flip-flops 1508 and removes a part of the masked area, line memories (LINE_RAM) 1511 and 1512 which store a single line of the image until the mask is completed, and masking processing sections (MASK) 1513 and 1514 which combine the image data with the mask data, sets the value of the masked area to be zero, and outputs values in the other areas as they are.

Next, it will be described how the circuit of this embodiment operates.

The two images that have been captured by being subjected to the exposure process by the camera under mutually different emission conditions are loaded into the circuit simultaneously by the camera input section 1501. These images are saved in the line memories 1511 and 1512 and passed to the difference creating section 1502 on a line-by-line basis. The difference creating section 1502 calculates the difference between the two signals and outputs the difference. The local maximum value searching section 1503 determines whether or not the difference provided by the difference creating section 1502 is equal to or greater than a predefined threshold value. If the answer is YES, the decision is made that it is the left edge of the subject and the result is passed to the controller 1506. The local minimum value searching section 1504 determines whether or not the difference provided by the difference creating section 1502 is equal to or smaller than a predefined threshold value. If the answer is YES, the decision is made that it is the right edge of the subject and the result is passed to the controller 1506.

The counter section 1515 is a counter to be reset in response to a horizontal sync signal from the camera input section 1501 and incremented in response to a pixel clock signal. The value of the counter section 1515 represents the location of a pixel currently scanned on a line of the image. This value is passed as address information to the flip-flops 1507 functioning as a mask information storage section and to the flip-flops 1508 functioning as a pairing information storage section.

The mask generating section 1505 determines whether or not the absolute value of the difference provided by the difference creating section 1502 is equal to or greater than the predefined threshold value. If the absolute value of the difference turns out to be smaller than the threshold value, decision is made that this is an area to be masked (i.e., non-subject area), and one of the flip-flops 1507 functioning as a mask information storage section is set at the location specified by the address that has been provided by the counter section 1515.

The controller 1506 receives a horizontal sync signal from the camera input section 1501 and resets all of the flip-flops 1507 functioning as a mask information storage section. Then, the controller 1506 itself enters a first operating state and waits until left edge information is provided by the local maximum value searching section 1503.

If the left edge information is provided by the local maximum value searching section 1503, the controller 1506 sets all of the flip-flops 1508 functioning as a pairing information storage section and then changes states into a second operating state.

In the second operating state, the controller 1506 resets one of the flip-flops 1508 functioning as a pairing information storage section at the location specified by the address that has been provided by the counter section 1515.

On the other hand, when provided with the right edge information by the local minimum value searching section 1504 while operating in the second operating state, the controller 1506 defines the area where one of the flip-flops 1508 functioning as a pairing information storage section is reset at that time to be the pairing area. Then, the controller 1506 makes the mask subtracting section 1509 apply the AND of the flip-flops 1508 to the flip-flops 1507 and unmasks the pairing area. Subsequently, the controller 1506 changes states into the first operating state by itself, and waits until the left edge information is provided by the local maximum value searching section 1503.

After this series of operations has been performed through the end of the single line, the image data stored in the line memories 1511 and 1512 will be processed by the masking processing sections 1513 and 1514, respectively. These image data are changed based on the states of the flip-flops 1507 functioning as a mask information storage section so that the luminance values of pixels in the masked area become close to zero, and then output as an image from which the background light area has been removed.

By configuring such a circuit, a background light removing circuit which can get the processing done in the same amount of time in every case without depending on the contents of data is realized.

It should be noted that the local maximum value to be searched for by the local maximum value searching section 1503 and the local minimum value to be searched for by the local minimum value searching section 1504 depend on the sign of the signal to process and may be reversed depending on the definition of the signal.

(Other Embodiments)

Although Embodiments 1 to 4 have been described as just an example of the technique of the present disclosure, the technique of the present disclosure is also implementable as various other embodiments, only some of which will be described below.

Figure 24:
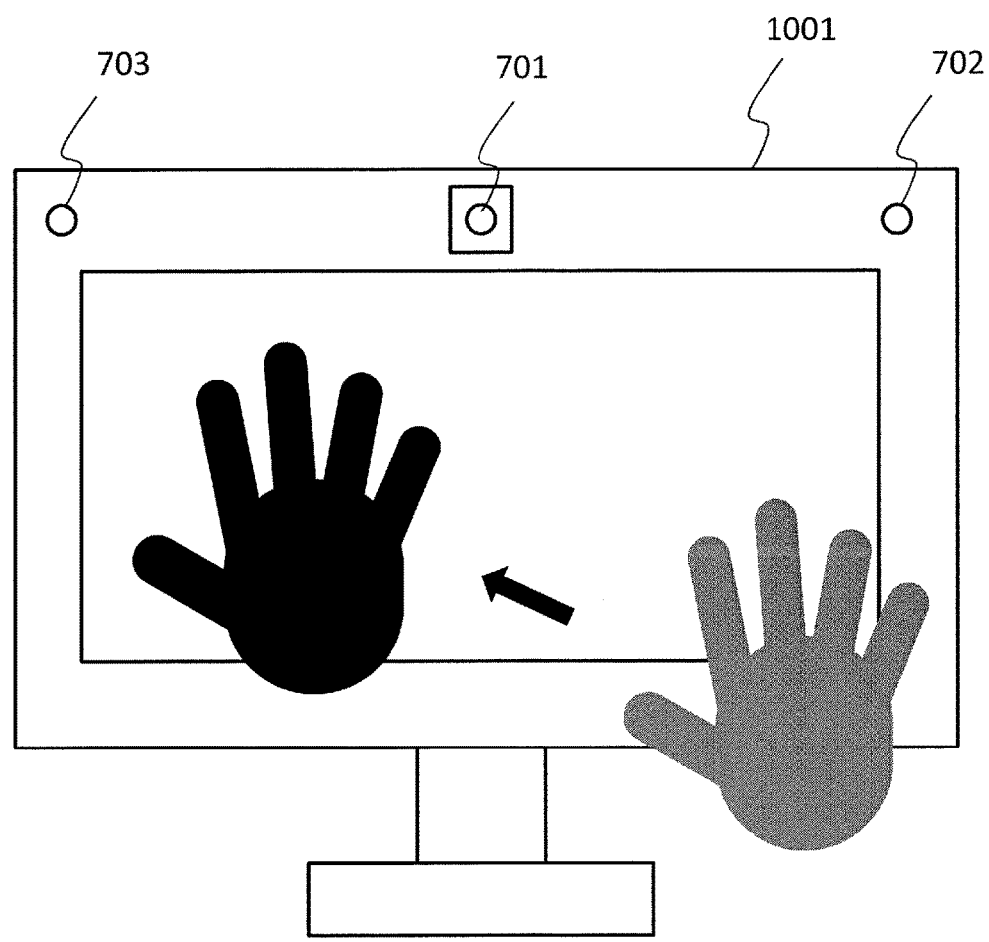
FIG. 24 Illustrates a display 1001 with a motion sensor device according to the first embodiment.

FIG. 24 illustrates a display 1001 with a motion sensor device according to the first embodiment. This display 1001 includes two light sources 702 and 703. That is why a gesture input can be made toward the display 1001. In FIG. 24, illustrated schematically is a hand making the gesture input for your reference. The hand illustrated in FIG. 24 is moving in the direction indicated by the arrow. The display shown in FIG. 24 can sense such a motion of the hand (i.e., a gesture input) with high sensitivity.

If the motion sensor device of this embodiment is applied to a display, for example, the device can be used as a user interface which allows the user to change channels with a gesture input. This motion sensor device is also applicable to a dance game to recognize the motion of respective limbs of a human being.

Optionally, a motion sensor device according to the second embodiment or any other embodiment described above may be built in the display shown in FIG. 24. As can be seen, the present disclosure may be implemented as an electronic device including a motion sensor device according to any of the embodiments described above and a display which changes the content to be presented thereon in response to the object's motion that has been detected by the motion sensor device.

A motion sensor device according to various embodiments of the present disclosure can reduce the influence of the background light other than the object, of which the distance needs to be measured, and therefore, can detect the object even more accurately. Thus, the present disclosure can provide a 3D motion sensor device which is required to detect the object in real time.

Optionally, some of the functions of a motion sensor device according to the present disclosure may be performed by another device which is connected to the former device through a wired or wireless network.

In the embodiments described above, a method for getting information about the distance to the object based on the ratio of the luminances of the objects in a plurality of images has been described as just an example. However, information about the distance to the object may also be obtained by reference to information about the image profile, instead of the luminance ratio, as disclosed in United States Laid-Open Patent Publication No. 2013/0182077, the entire disclosure of which is hereby incorporated by reference.

INDUSTRIAL APPLICABILITY

An embodiment of a motion sensor device according to the present disclosure has the ability to measure the three-dimensional position of a target in real time, and therefore, can be used effectively as a non-contact gesture user interface for a display device and various other kinds of electronic devices. In addition, this motion sensor device may also be used as a car device to monitor the state of person(s) inside the car and persons outside of the car and to detect any obstacles. Furthermore, the motion sensor device can also be used in autofocusing for a camcorder.

REFERENCE SIGNS LIST

100, 700 substrate
101, 701 image sensor
102, 103, 702, 703, 704 light source unit
104, 506, 507, 508, 705 object
301, 302, 1201, 1202 luminance
303, 304 local maximum value of luminance
505, 706 external light source
509 reflected light coming from light source unit
510 external direct light
511 external first-order reflected light
512 external second-order reflected light
601, 611, 621, 1001, 1011 object image
602, 612, 1002, 1012 image of external light source
710, 810, 910 controller
711, 1502 difference creating section
712, 1513, 1514 masking processing section
713 distance calculating section
814 amplifying section
901 lens
902, 903 image sensor
904 half mirror
1001 display
1203 luminance difference
1204 subject range
1205 external light source range
1401, 1503 local maximum value searching section
1402, 1504 local minimum value searching section
1403 pairing section
1404, 1509 mask subtracting section
1501 camera input section
1505 mask generating section
1507 flip-flops functioning as mask information storage section
1508 flip-flops functioning as pairing information storage section
1511, 1512 line memory
1515 counter section

The invention claimed is:

1. A motion sensor device comprising:
an image sensor;
first, second, and third light sources; and
a controller configured to control the image sensor and the first and second light sources,
wherein the controller is configured to:
make the image sensor capture a first frame with light emitted from the first light source at a first time;
make the image sensor capture a second frame with light emitted from the second light source at a second time;
make the image sensor capture a third frame with light emitted from the third light source at a third time;
perform first masking processing on a first image gotten by capturing the first frame and on a second image gotten by capturing the second frame based on a difference between the first and second images;
obtain a first piece of information about the distance to an object shot in the first and second images based on the first and second images that have been subjected to the first masking processing;
perform second masking processing on the second image gotten by capturing the second frame and on a third image gotten by capturing the third frame based on a difference between the second and third images;
obtain a second piece of information about the distance to an object shot in the second and third images based on the second and third images that have been subjected to the second masking processing.

2. The motion sensor device of claim 1, wherein the first masking processing is processing of removing an area in which the difference in luminance value between a pixel in the first image and its corresponding pixel in the second image is smaller than a threshold value from the first and second images.

3. The motion sensor device of claim 1, wherein the controller is configured to make the second light source emit light at a different output power from the first light source.

4. The motion sensor device of claim 1, wherein the controller is configured to decide whether or not to perform the first and/or second masking processing or change a coefficient for use to make calculations for the first and/or second masking processing based on at least one of the optical output power of the first light source, the optical output power of the second light source, the exposure period of the image sensor, the gain of the image sensor, a focusing state of the image sensor, and a lens stop setting.

5. The motion sensor device of claim 1, wherein the controller is configured to decide whether or not to perform the first and/or second masking processing or change a coefficient for use in the first and/or second masking processing based on at least one of information about the distance to the object, information about its size and information about its material property.

6. A motion sensor device comprising:
an image sensor;
first, second, and third light sources; and
a controller configured to control the image sensor and the first and second light sources,
wherein the controller is configured to:
make the image sensor capture a first frame with light emitted from the first light source at a first time;
make the image sensor capture a second frame with light emitted from the second light source at a different output power from the first light source at a second time;
make the image sensor capture a third frame with light emitted from the third light source at a third time;
perform first masking processing on a first image gotten by capturing the first frame and on a second image gotten by capturing the second frame based on a difference between the first and second images;
perform first luminance correction processing on at least one of the first and second images that have been subjected to the first masking processing based on a difference in optical output power between the first and second light sources;
obtain a first piece of information about the distance to an object based on the ratio of the luminance of the object derived from the first image that has been subjected to the first luminance correction processing to the luminance of the object derived from the second image that has been subjected to the first luminance correction processing;
perform second masking processing on the second image gotten by capturing the second frame and on a third image gotten by capturing the third frame based on a difference between the second and third images;
perform second luminance correction processing on at least one of the second and third images that have been subjected to the second masking processing based on a difference in optical output power between the second and third light sources; and
obtain a second piece of information about the distance to an object based on the ratio of the luminance of the object derived from the second image that has been subjected to the second luminance correction processing to the luminance of the object derived from the third image that has been subjected to the second luminance correction processing.

7. The motion sensor device of claim 6, wherein the first masking processing is processing of removing an area in which the difference in luminance value between a pixel in the first image and its corresponding pixel in the second image is smaller than a threshold value from the first and second images.

8. The motion sensor device of claim 6, wherein the second light source is arranged closer to the image sensor than the first light source is, and
the controller is configured to make the image sensor capture the second frame with light emitted from the second light source at a lower output power than the first light source.

9. The motion sensor device of claim 6, wherein the second light source is arranged closer to the image sensor than the first and third light sources are, and
the controller is configured to make the image sensor capture the second frame with light emitted from the second light source at a lower output power than the first and third light sources.

10. A motion sensor device comprising:
an image sensor;
first and second light sources; and
a controller configured to control the image sensor and the first and second light sources,
wherein the controller is configured to:
make the image sensor capture a first frame with light emitted from the first light source at a first time;
make the image sensor capture a second frame with light emitted from the second light source at a second time;
generate differential data representing a difference between a first image gotten by capturing the first frame and a second image gotten by capturing the second frame;
locate an estimated object area which forms part of the differential data between a point where the difference becomes a local maximum value and a point where the difference becomes a local minimum value and which has a direction corresponding to a direction in which the first and second light sources are arranged;
perform masking processing on the entire first and second images but the estimated object area based on a difference between the first and second images; and
obtain information about the distance to the object shot in the first and second images based on the first and second images that have been subjected to the masking processing.

11. The motion sensor device of claim 10, wherein the masking processing is processing of removing an area in which the difference in luminance value between a pixel in the first image and its corresponding pixel in the second image is smaller than a threshold value from the first and second images.

* * * * *